US011519581B2

(12) United States Patent
Crompvoets et al.

(10) Patent No.: US 11,519,581 B2
(45) Date of Patent: Dec. 6, 2022

(54) VEHICLE LIGHT ASSEMBLY COMPRISING FLEXIBLE LIGHTING STRIP

(71) Applicant: Lumileds LLC, San Jose, CA (US)

(72) Inventors: Floris Maria Hermansz Crompvoets, Bunde (NL); Andreas Timinger, Aachen (DE); Christian Kleijnen, Ell (NL); Ralph Hubert Peters, Kerkrade (NL); Adam Lind, Aldenhoven (DE); Rob Bastiaan Maria Einig, Aldenhoven (DE); Tobias Fink, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/340,979

(22) PCT Filed: Oct. 10, 2017

(86) PCT No.: PCT/EP2017/075781
§ 371 (c)(1),
(2) Date: Apr. 10, 2019

(87) PCT Pub. No.: WO2018/069301
PCT Pub. Date: Apr. 19, 2018

(65) Prior Publication Data
US 2019/0293256 A1     Sep. 26, 2019

(30) Foreign Application Priority Data
Oct. 14, 2016 (EP) ..................................... 16193838

(51) Int. Cl.
*F21S 43/249*       (2018.01)
*F21S 43/14*        (2018.01)
(Continued)

(52) U.S. Cl.
CPC .............. *F21S 43/249* (2018.01); *B60Q 1/28* (2013.01); *B60Q 1/30* (2013.01); *F21S 43/14* (2018.01);
(Continued)

(58) Field of Classification Search
CPC ........ F21S 43/249; F21S 43/247; F21S 43/14; F21S 43/30; F21S 43/19; F21S 43/243;
(Continued)

(56) References Cited

U.S. PATENT DOCUMENTS 6,471,388 B1 * 10/2002 Marsh .................. G02B 6/0031
                                                 313/318.11
3,322,902 A1    12/2012 Martin et al.
(Continued)

FOREIGN PATENT DOCUMENTS

CN     101482237 A    7/2009
CN     103204199 A    7/2013
(Continued)

OTHER PUBLICATIONS

Japanese Office Action dated Mar. 27, 2021 for Japanese Patent Application No. 2019-520007.
(Continued)

*Primary Examiner* — Bao Q Truong
(74) *Attorney, Agent, or Firm* — Volpe Koenig

(57) ABSTRACT

A vehicle light assembly comprising: a flexible lighting strip comprising a multitude of light-emitting diodes, wherein the flexible lighting strip is arranged to be bent around at least two, more preferred three linear independent axes; a light guiding structure comprising a light receiving surface and a primary light emission surface, wherein the light receiving surface receives light emitted by the flexible lighting strip, wherein the primary light emission surface emits at least a part of the light received via the light receiving surface, and
(Continued)

wherein the light receiving surface is arranged to define a bending of the flexible lighting strip; a coupling structure that is arranged to mechanically couple the flexible lighting strip to the light receiving surface in accordance with the bending defined by the light receiving surface. The invention further describes a vehicle rear light or vehicle front light comprising the vehicle light assembly.

19 Claims, 14 Drawing Sheets

(51) Int. Cl.
| | |
|---|---|
| F21S 43/19 | (2018.01) |
| F21S 43/243 | (2018.01) |
| F21S 43/245 | (2018.01) |
| F21S 43/15 | (2018.01) |
| F21S 43/241 | (2018.01) |
| F21S 43/247 | (2018.01) |
| F21S 43/30 | (2018.01) |
| F21S 43/239 | (2018.01) |
| B60Q 1/28 | (2006.01) |
| B60Q 1/30 | (2006.01) |
| F21V 8/00 | (2006.01) |
| G02B 6/00 | (2006.01) |
| F21Y 103/30 | (2016.01) |
| F21Y 115/10 | (2016.01) |
| F21Y 107/70 | (2016.01) |
| F21Y 103/10 | (2016.01) |

(52) U.S. Cl.
CPC ............... *F21S 43/15* (2018.01); *F21S 43/19* (2018.01); *F21S 43/239* (2018.01); *F21S 43/241* (2018.01); *F21S 43/243* (2018.01); *F21S 43/245* (2018.01); *F21S 43/247* (2018.01); *F21S 43/30* (2018.01); *G02B 6/00* (2013.01); *G02B 6/0031* (2013.01); *F21Y 2103/10* (2016.08); *F21Y 2103/30* (2016.08); *F21Y 2107/70* (2016.08); *F21Y 2115/10* (2016.08)

(58) Field of Classification Search
CPC ........ F21S 43/239; F21S 43/245; F21S 43/15; F21S 43/241; B60Q 1/28; B60Q 1/30; G02B 6/00; G02B 6/0031; G02B 6/0091; G02B 6/0021; G02B 6/0086; G02B 6/0081; F21Y 2103/30; F21Y 2103/10; F21Y 2115/10; F21Y 2107/70
See application file for complete search history.

(56) References Cited

U.S. PATENT DOCUMENTS

| | | | |
|---|---|---|---|
| 9,074,744 B2 | 7/2015 | Tsukamoto | |
| 9,423,097 B2 | 8/2016 | Haenen et al. | |
| 9,753,208 B2 | 9/2017 | Ban et al. | |
| 10,018,325 B2 | 7/2018 | Kim et al. | |
| 10,151,441 B2* | 12/2018 | Ito | F21S 43/19 |
| 10,711,971 B2 | 7/2020 | Crompvoets et al. | |
| 2005/0270794 A1* | 12/2005 | Okamoto | F21V 5/008 |
| | | | 362/555 |
| 2008/0232127 A1* | 9/2008 | Futami | F21V 7/09 |
| | | | 362/511 |
| 2013/0335975 A1 | 12/2013 | Park et al. | |
| 2014/0160778 A1* | 6/2014 | Nakada | G02B 6/002 |
| | | | 362/511 |
| 2015/0009705 A1* | 1/2015 | Tsuchiya | F21S 43/245 |
| | | | 362/558 |
| 2015/0226996 A1 | 8/2015 | Ohashi | |
| 2015/0285462 A1 | 10/2015 | Shimoda | |
| 2017/0363267 A1* | 12/2017 | Maitre | G02B 6/0006 |

FOREIGN PATENT DOCUMENTS

| | | |
|---|---|---|
| CN | 203909435 U | 10/2014 |
| CN | 204477860 U | 7/2015 |
| DE | 10201219081 A1 | 4/2016 |
| DE | 102015219081 A1 | 4/2016 |
| EP | 2677237 A2 | 12/2013 |
| JP | 04-129408 U | 11/1992 |
| JP | 3148012 A | 6/1996 |
| JP | 9007414 A | 1/1997 |
| JP | 2005-072530 A | 3/2005 |
| JP | 2007-250273 A | 9/2007 |
| JP | 3191535 U | 6/2014 |
| JP | 2014-149963 A | 8/2014 |
| JP | 2014-203729 A | 10/2014 |
| JP | 2016-171055 A1 | 5/2017 |
| KR | 20160117122 A | 10/2016 |
| WO | 2014/120245 A1 | 8/2014 |
| WO | 2016/066476 A1 | 5/2016 |

OTHER PUBLICATIONS

International Preliminary Report on Patentability Chapter 1 dated Apr. 16, 2019 for PCT International Application No. PCT/EP2017/075781.
International Search Report dated Feb. 5, 2018 for PCT International Application No. PCT/EP2017/075781.

\* cited by examiner

VEHICLE LIGHT ASSEMBLY COMPRISING FLEXIBLE LIGHTING STRIP

FIELD OF THE INVENTION

The invention relates to a vehicle light assembly comprising a flexible lighting strip. The invention further shows an electrical interface which can be used to electrically connect a flexible lighting strip within such a vehicle light assembly. The invention further shows connectors which can be used to optically and/or mechanically connect two or more flexible lighting strips. The invention further shows a lighting strip terminator which can be used to finalize a flexible lighting strip. The invention finally relates to a vehicle rear light or vehicle front light comprising such a vehicle light assembly.

BACKGROUND OF THE INVENTION

Recent vehicle rear lights or front lights comprise light-emitting diodes (LED). The small size of LEDs enables customization of light patterns which can be provided by means of such vehicle light sources.

KR 2016 0117122 A discloses an automotive lighting apparatus. The automotive lighting apparatus includes a light emitting diode module emitting light, a light guiding plate which emits light emitted from the light emitting diode module to the side and emits light incident on the side surface so as to emit light to the upper side. The light guiding plate includes at least one concave portion in a planar shape. The light emitting diode module is provided along the inner surface of the annular shape, so that the surface light emission on the entire light guide plate can be uniformly emitted.

SUMMARY OF THE INVENTION

It is an object of the present invention to provide a vehicle light assembly comprising one or more flexible lighting strip(s) comprising a multitude of LEDs. The vehicle light assembly aims to improve flexibility with respect to definition of light patterns which can be provided by means of a vehicle rear light or front light. Signaling of vehicle rear lights or front lights may be improved by means of the vehicle light assembly. The vehicle light assembly further aims to provide a simple building set or kit to provide a customized vehicle front or rear light.

The invention is defined by the independent claims. The dependent claims define advantageous embodiments.

According to a first aspect a vehicle light assembly is provided. The vehicle light assembly comprises:
- a flexible lighting strip comprising a multitude of light-emitting diodes (LEDs), wherein the flexible lighting strip is arranged to be bended around at least two, more preferred three linear independent axes;
- a light guiding structure comprising a light receiving surface and a primary light emission surface, wherein the light receiving surface is arranged to receive light emitted by the flexible lighting strip, wherein the primary light emission surface is arranged to emit at least a part of the light received via the light receiving surface, and wherein the light receiving surface is arranged to define a bending of the flexible lighting strip;
- a coupling structure, wherein the coupling structure is arranged to mechanically couple the flexible lighting strip to the light receiving surface in accordance with the bending defined by the light receiving surface.

The flexible lighting strip is preferably sealed against environment and emits light via one side: the light output surface of the flexible lighting strip. Especially the other part of the perimeter of the flexible lighting strip may provide a mechanical interface to mount the flexible lighting strip within in the vehicle light assembly. The flexible lighting strip is preferably adapted such that a homogeneous light emission is provided. Homogeneous light emission means that it is essentially not possible to identify emission of a single LED comprised by the flexible lighting strip. Luminance of the flexible lighting strip is essential constant across the whole light output surface. The flexible lighting strip is arranged as a linear extended and bendable light source which preferably provides a Lambertian directional light emission profile with a moderately collimated output (e.g. 60° to 80° Full Width at Half Maximum—FWHM). The light output surface preferably extends across the complete length of the flexible lighting strip such that there are no dark ends. The flexible lighting strip preferably emits white or colored light in the range between 10 lm/m and 200 lm/m. The flexible lighting strip is preferably bendable around all three dimensions for mounting in the vehicle light assembly. The flexible lighting strip is therefore also bendable around the axis of light emission defined by a normal of the light output surface. Prior art flex boards are only bendable around 1 axis at any location. The length of the flexible lighting strip may be between 10 cm and 200 cm. A width of the flexible lighting strip perpendicular to the normal of the light output surface and the linear extension of the straight flexible lighting strip (no bending) is preferably less than 10 mm, the light output surface has a width of preferably less than 4 mm.

Conventional vehicle light sources are arranged such that the light source determines the corresponding optic in order to provide a defined light pattern. The flexible lighting strip is in contrast to this conventional approach adapted such that the coupling structure, the light receiving surface and/or the at least one primary light emission surface defines a light emission pattern which can be provided by means of the vehicle light assembly. A local curvature of the coupling structure and/or the light receiving surface may determine a local curvature or bending of the lighting strip.

The flexible lighting strip may comprise:
- an elongate, flexible support;
- at least one line of LEDs mounted on the flexible support; and
- a carrier structure for carrying the flexible support, wherein the carrier structure comprises:
  - a flexible base on which the flexible support is mounted;
  - flexible side walls to each side of the flexible support, defining a channel over the flexible support, the side walls providing a light mixing function within the channel; and
  - a flexible layer in the channel, the top of the channel forming the light output area or surface of the flexible lighting strip, wherein the flexible layer is adapted to increase the uniformity of the light output and/or increase the collimation of the light output.

The flexible lighting strip provides an elongate arrangement of LEDs which may be deformed into a desired 3D configuration. In this way, a standard component which may be mass produced may be used for multiple different applications, thereby reducing manufacturing costs. The flexible layer performs an optical function.

The channel defined by the carrier structure functions as a mixing chamber over the LEDs. The channel dimensions and the material of the carrier structure determine the way the light output from the multiple LEDs is mixed or shaped. The top of the channel defines the light output surface, which is thus in a strip shape. The flexible layer may be transparent, but it may additionally have a scattering function. The scattering may be uniform or there may be different scattering intensity at different points in the volume of the layer. This scattering function may be used to generate a specific desired beam. Many beam variations are then possible.

The lighting strip may be made very compact and can be shaped into almost any form desired by the required light emission pattern.

The carrier may be formed from a flexible white material or a white-coated material or a mirror-coated material, so that the side walls mix the light within the channel by scattering of light at the channel sides. In this way, a continuous strip of illumination may be formed. However, discrete light output points may instead be visible if desired. The carrier may be formed from an extruded material such as silicone. The carrier may also be selected as a thermally conductive material to provide a heat dissipation function.

The flexible layer may comprise an extruded component such as a silicone. This defines the light output surface, and it may perform an optical processing function such as beam shaping or scattering. For example, it may comprise a scattering medium or diffractive structures.

The characteristics of the light output can be controlled by suitable selection of the materials and/or surface properties of the carrier structure, the dimensions of the channel, and the material and optical properties of the flexible layer. These components and parameters together function to process the light output from the LEDs.

The flexible support may comprise a flexible electrical connection structure like a flexible printed circuit board or a lead frame. In either case, the support carries the LEDs and is able to be deformed to adopt a desired shape as described above.

The LEDs may each comprise a direct color emitting chip or a chip with a phosphor converter. They are, for example, formed as discrete elements mounted on the carrier. Each LED may comprise a respective output structure. This may perform an optical function as well as a protective function.

The flexible layer may comprise a multi-layer structure, wherein the multiple layers are formed from different materials or materials with different optical coatings.

The flexible layer may comprise an exit structure at the top, which comprises an array of light redirecting facets (such as parallel prisms or a Fresnel structure) or an array of lenses. Alternatively, an array of light redirecting facets or an array of lenses may be provided within the flexible layer.

The flexible layer may instead or additionally comprise a patterned reflecting layer, the pattern comprising an array of openings in the layer. This may be at the top of the channel or at a different height within the channel. The flexible layer may comprise a total internal reflection lightguide structure. This may be used to average the light output over area to reduce the visibility of the LEDs such that an essentially homogeneous flexible linear light source is provided.

The vehicle light assembly may comprise two, three, four or more flexible lighting strips which may be arranged in a serial, parallel or combined arrangement or more generally in a branched arrangement as described below.

The light guiding structure or light distribution structure is arranged to distribute light emitted by the flexible lighting strip or flexible lighting strips. The light guiding structure may comprise a light guide comprising at least a part of the light receiving surface and at least a part of the primary light emission surface. The light guide may, for example, be a light blade with at least one light receiving surface and at least one primary light emission surface. The light receiving surface and or the primary light emission surface may comprise a coating structure in order to influence the light emission pattern which can be provided by means of the vehicle light assembly. The light guide may alternatively have any shape in order to provide a required light pattern. The light guide may, for example, comprise one or more secondary light emission surfaces. The secondary light emission surface is arranged to emit at least a part of the light received via the light receiving surface. The one or more primary light emission surface(s) may, for example, emit a major part of the light received via the light receiving surface wherein the one or more secondary light emission surface(s) may be arranged to emit a minor part of the light received via the light receiving surface in order to provide a defined light pattern. The primary light emission surface(s) may alternatively provide a higher luminance than the secondary light emission surface(s) but the luminous flux provided by means of the primary light emission surface(s) may be smaller than the luminous flux provided by means of the secondary light emission surface(s).

The light guiding structure may alternatively or in addition comprise a reflective structure. The reflective structure comprises at least a part of the light receiving surface and at least a part of the primary light emission surface. The respective part of the light receiving surface and the primary light emission surface are in comparison to the configuration discussed above (light guide) identical. The light output surface of the flexible lighting strip may be arranged by means of the coupling structure such that the reflective structure is illuminated in a defined way. Curvature or bending of the flexible lighting strip is adapted to the reflective characteristic provided by means of the reflective structure in order to provide a required or defined light pattern. The reflective structure may comprise reflective substructures. A first reflective substructure may, for example, be a specular reflective surface. A second reflective substructure may, for example, be a diffuse reflective surface. Combination of one or more specular reflective surfaces and/or one or more diffuse reflective surfaces may be used in order to define a required lighting pattern.

The light guiding structure may alternatively or in addition comprise a scattering structure. The scattering structure comprises at least a part of the light receiving surface and at least a part of the primary light emission surface. The scattering structure is used to widen a light distribution provided by means of the flexible lighting strip. The scattering structure may be combined with one or more light guides and/or one or more reflective structures.

The light receiving surface may be bended around at least one, preferably at least two of the three linear independent axes (e.g. axes of a Cartesian coordinate system). Bending of the light receiving surface of the light guide used as light guiding structure causes a corresponding bending of the flexible lighting strip because the light output surface is mechanically coupled to the light receiving surface by means of the coupling structure. Local curvature of the light output surface of the flexible lighting strip is in this case mechanically determined by the curvature of the light receiving surface. The light guide may additionally arranged such that one or more secondary light emission surface(s) is/are bended around at least two of the three linear independent axes. Local curvature of the secondary light emission surface influences light outcoupling because of changing total internal reflection properties at the secondary light outcoupling surface of the light guide. The local curvature of the secondary light emission surface can therefore be arranged such that a defined light pattern is provided by means of the vehicle light assembly. The one or more secondary light emission surface may further comprise a coating structure (e.g. reflective coating) in order to influence the light pattern provided by the vehicle light assembly. The coating structure may comprise a foil or a film coating provided on the secondary light emission surface.

Local curvature of a light receiving surface of a reflective structure or scattering structure determines local curvature of the light output surface of the flexible lighting strip (or local curvature of the flexible lighting strip) by the intended optical coupling in order to provide a required light pattern.

The light guide may comprise at least one notch such that the primary light emission surface is discontinuous (or there is according to an alternative description depending on the number of notches a defined number of primary light emission surface which appear during light emission to be separated from each other). A notch may be, for example, a saw lane through the light guide extending from the primary light emission surface to, for example, the light receiving surface without separating the light guide (e.g. light blade). The light guide comprises a base structure connecting finger structures extending from the base structure wherein the finger structures are separated by the notches. One or more notches may be used to enable a discontinuous primary light emission surface. The separated parts of the primary light emission surface can be twisted with respect to each other. Twisting of the separated parts of the primary light emission surface is enabled by means of twisting the finger structures. Twisting may, for example be enabled by means of a transparent material which may be deformed (twisted or bended) during a heating procedure after providing saw lanes. Alternatively, molding with properly designed tools or 3-D printing may be used in order to manufacture such complex bended and twisted light guides in order to provide at least one discontinuous primary light emission surface. The notches enable a defined light emission pattern without the need of separate lighting modules and corresponding electrical connections.

The primary and/or secondary light emission surface may comprise a light outcoupling structure. The light outcoupling structure may be, for example, a defined scratch increasing the light output. The light outcoupling structure may alternatively comprise volume scattering increasing or decreasing in combination with the local curvature of the light guide light output via the primary and/or secondary light emission surface. Volume scattering may be enabled by means of scattering particles provided within the material of the light guide.

The coupling structure may be an integrated part of the light guiding structure. The coupling structure may be a socket or slot comprised by the light guiding structure by means of which the flexible lighting strip can be fixed such that the light output surface of the flexible lighting strip has a defined curvature in order to emit light in a defined way to the light receiving surface.

The coupling structure may alternatively be a separate structure which comprises a mechanical coupling surface for receiving the flexible lighting strip and a fixing structure for fixing the coupling structure such that the flexible lighting strip is arranged between the mechanical coupling surface and the light receiving surface. The coupling structure can in this configuration be removed from the light guiding structure. The flexible lighting strip may be placed on the mechanical coupling surface such that the light output surface is characterized by a defined local curvature in order to emit light in a defined way to the light receiving surface. The coupling structure may alternatively or in addition be flexible such that bending of the flexible lighting strip is defined during the coupling process of the coupling structure to the light guiding structure.

The vehicle light assembly may comprise at least one flexible lighting strip. The vehicle light assembly may further comprise at least one connector for connecting end-surfaces of the at least one flexible lighting strip such that a homogeneous light emission surface is provided by the at least one flexible lighting strips and the at least one connector. The connector may, for example, be arranged to connect two end surfaces of a flexible lighting strip in a circular arrangement. One end surface of the flexible lighting strip is connected to a first coupling interface of the connector and another second end surface of the flexible lighting strip is connected to a second coupling interface of the connector in order to provide circular vehicle light assembly. The connector may according to an alternative embodiment be a linear connector in order to provide a linear extended arrangement of two flexible lighting strips or an edge connector in order to connect one or two flexible lighting strips at a corner of the vehicle light assembly. The connector may e.g. be arranged to visually and continuously connect two flexible lighting strips which are arranged to be separated from each other. A first flexible lighting strip may, for example, be arranged on a trunk deck and the second flexible lighting strip which can be connected by means of the connector to the first flexible lighting strip may be arranged on the trunk. The connector may alternatively be arranged to connect three, four or more flexible lighting strips such that a homogeneous light emission is provided by means of the three, four or more flexible lighting strips and the connector. The connector may in this configuration be arranged to connect the flexible lighting strips in a star like configuration. The connector may alternatively be arranged to connect the three, four or more flexible lighting strips in a corner of the vehicle light assembly similar as the case of two flexible lighting strips.

The connector may be arranged in a similar way as the flexible lighting strip described above. The connector may comprise:

a carrier structure comprising:

a base and side walls defining a channel, the base and/or side walls providing a light mixing and/or light extraction function within the channel;

a layer in the channel, the top of the channel forming the light output area or surface of the connector, wherein the layer is adapted to increase the uniformity of the light output; and at least two coupling interfaces which are arranged to be mechanically and optically coupled to flexible lighting strips described above.

The connector may optionally be deformed into a desired 3D configuration. The base, side walls and the layer in the channel are in this case flexible such that the connector can be bended in at least one dimension, preferably at least two dimensions and most preferably in all three dimensions. In this way, a standard component which may be mass produced may be used for multiple different applications, thereby reducing manufacturing costs. The layer or flexible layer arranged in the channel performs an optical function.

The channel defined by the carrier structure functions as a mixing chamber and/or light extraction function of light emitted by an flexible lighting strip coupled to the respective coupling interface of the connector. The top of the channel defines the light output surface. The shape of the light output surface depends on the coupling function of the connector (straight connector, edge connector, connector connecting three, four or more flexible lighting strips). The channel dimensions and the material of the carrier structure determine the way the light output received from the at least two flexible lighting strips is distributed and mixed such that luminance of the light output surface of the connector is preferably the same as luminance of the flexible lighting strips coupled to the connector. The (flexible) layer may be transparent, but it may additionally have a scattering function. The scattering may be uniform or there may be different scattering intensity at different points in the volume of the layer. This scattering function may be used to generate a specific desired beam. Distribution of, for example, scattering particles distributed in the layer is customized depending on the luminance of the flexible lighting strips coupled to the connector. Homogeneous distribution of scattering particles may be chosen if luminance of the flexible lighting strips is the same. A length of a passive linear connector may be the same as the distance between two LEDs in the lighting strip−2× distance from last LED in the lighting strip to coupling interface. The length may depend on light absorption within the connector. Scattering particles may be distributed in an inhomogeneous way (e.g. with a gradient) if flexible lighting strips with different luminance are connected by means of the connector in order to provide a smooth illumination pattern by means of the vehicle light assembly. The scattering and reflective properties of the base, the side walls and the layer may be adapted to the geometric structure of the connector (e.g. edge connector or star like connector).

The coupling interfaces of the connector and the flexible lighting strips are perpendicular to the respective arm of the connector (not bended) in order to avoid uncontrolled outcoupling of light at the coupling interface. Furthermore, antireflective coatings and/or a coupling material may be arranged between the flexible lighting strips and the connectors in order to improve optical coupling. The coupling material has preferably the same or nearly the same refractive index as the material of the layer within the flexible lighting strips and the connector.

The connector may be made very compact and can be shaped into almost any form desired by the required light emission pattern.

The carrier may be formed from a flexible white material or a white-coated material or a mirror-coated material, so that the side walls mix the light within the channel by scattering of light at the channel sides. In this way, a continuous strip of illumination may be formed. However, discrete light output points may instead be visible if desired. The carrier may be formed from an extruded material such as silicone. The carrier may also be selected as a thermally conductive material to provide a heat dissipation function.

The layer may be a flexible layer which may comprise an extruded component such as a silicone. This defines the light output surface, and it may perform an optical processing function such as beam shaping or scattering. For example, it may comprise a scattering medium or diffractive structures.

The characteristics of the light output can be controlled by suitable selection of the materials and/or surface properties of the carrier structure, the dimensions of the channel, and the material and optical properties of the flexible layer.

The flexible layer may comprise a multi-layer structure, wherein the multiple layers are formed from different materials or materials with different optical coatings.

The flexible layer may comprise an exit structure at the top, which comprises an array of light redirecting facets (such as parallel prisms or a Fresnel structure) or an array of lenses. Alternatively, an array of light redirecting facets or an array of lenses may be provided within the flexible layer. The latter may be enabled by means of sufficient contrast in refractive index between the light directing facets and the upstream light transmitting material (matrix material of the transparent layer).

The flexible layer may instead or additionally comprise a patterned reflecting layer, the pattern comprising an array of openings in the layer. This may be at the top of the channel or at a different height within the channel. The flexible layer may comprise a total internal reflection lightguide structure. This may be used to average the light output over area such that an essentially homogeneous connector is provided.

The connector may alternatively comprise a channel (base and side walls) made of a rigid material. The layer may in this case comprise a rigid material (e.g. transparent plastic) or a flexible material as described above.

The carrier may comprise electrically conductive structures which are arranged to electrically connect two, three or more flexible lighting strips via the coupling interface. The coupling interface is in this case also used for electrically coupling the flexible lighting strips. The electrically conductive structures like, for example, wires enable power supply of more than one flexible lighting strip by means of one electrical interface.

The light guiding structure which is combined with the flexible lighting strips and the connector or connectors may comprise two or more separate parts or may be one light guiding structure.

There may be one coupling structure for coupling e.g. a combination of two light guides and a connector to the light guiding structure. Alternatively, there may be, for example two coupling structures. Two or more coupling structures may optionally be mechanically coupled by means of a mechanical interconnect.

The vehicle light assembly may comprise one or more lighting strip terminators. The lighting strip terminator may be coupled to an end surface of the flexible lighting strip. The lighting strip terminator is arranged such that light emitted by the light emitting diodes leaving the flexible lighting strip via the end surface is at least partly recycled.

The lighting strip terminator comprises a coupling interface at the end surface which may be arranged in the same way as described above with respect to the connector. The coupling interface of the lighting strip terminator may be coupled to a corresponding coupling interface of the flexible lighting strip in the same way as described above with respect to the connector such that essentially all light impinging on the end surface enters the lighting strip terminator. The construction of the lighting strip terminator may be very similar to the construction of the connector. The lighting strip terminator may comprise a carrier and the layer as described above. The lighting strip terminator may optionally be flexible as the connector. Light mixing and/or scattering of light entering the lighting strip terminator via the optical interface is preferably arranged such that luminance of a light output surface of the light strip terminator is the same than luminance of the flexible lighting strip optically coupled to the lighting strip terminator. Reflection and/or scattering in the lighting strip terminator may therefore be adapted accordingly. Length of the light output surface of the lighting strip terminator from the coupling interface may therefore be the same or (depending on absorption and other optical losses) less than the distance between two LEDs in the flexible lighting strip minus distance between the last LED in the flexible lighting strip to the coupling interface.

The lighting strip terminator may alternatively be arranged such that no light is emitted by means of the lighting strip terminator. The lighting strip terminator may comprise a preferably diffusely reflective surface which is arranged at the coupling interface of the light strip terminator. The reflective surface is arranged such that luminance of the flexible lighting strip terminated by means of the lighting strip terminator is homogeneous at the end of the flexible lighting strip being coupled to the lighting strip terminator. The distance between the end of the flexible lighting strip and the center of the next LED of the flexible lighting strip is in this case preferably half the distance between two LEDs in the lighting strip. The lighting strip terminator may be arranged to act as a mechanical support for mounting the vehicle light assembly to, for example, a vehicle light source.

The lighting strip terminator may be permanently coupled to the flexible lighting strip or may be detachably coupled to the flexible lighting strip (trunk and trunk deck as described above).

The vehicle light assembly may comprise an electrical interface. The electrical interface is arranged to couple the vehicle light assembly to an external power supply.

Electrical connection pins may be soldered to a flexible electrical connection structure (e.g. electrical lead frame or flexible board) of the flexible lighting strips. The connection pins and the flexible electrical connection structure may be overmolded in a subsequent processing step. The overmold may optionally act as body of the electrical interface (plug). Alternatively, the body may be added in a subsequent step to the overmold e.g. before or after providing the, for example, flexible silicone layer of the flexible lighting strip.

The flexible lighting strips may alternatively be arranged such that an electrical interface can be added at least at defined positions of the flexible lighting strip after assembly of the vehicle light assembly. An electrical interface may, for example, comprise pins which are arranged to penetrate the base of the flexible lighting strip in order to electrically contact the flexible electrical connection structure of the flexible lighting strip.

A vehicle rear light or vehicle front light may comprise the vehicle light assembly in accordance with any embodiment described above.

The vehicle light assembly may, for example, be used in daytime running light (DRL), tail light, stop light or turn light.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

Figure 1:
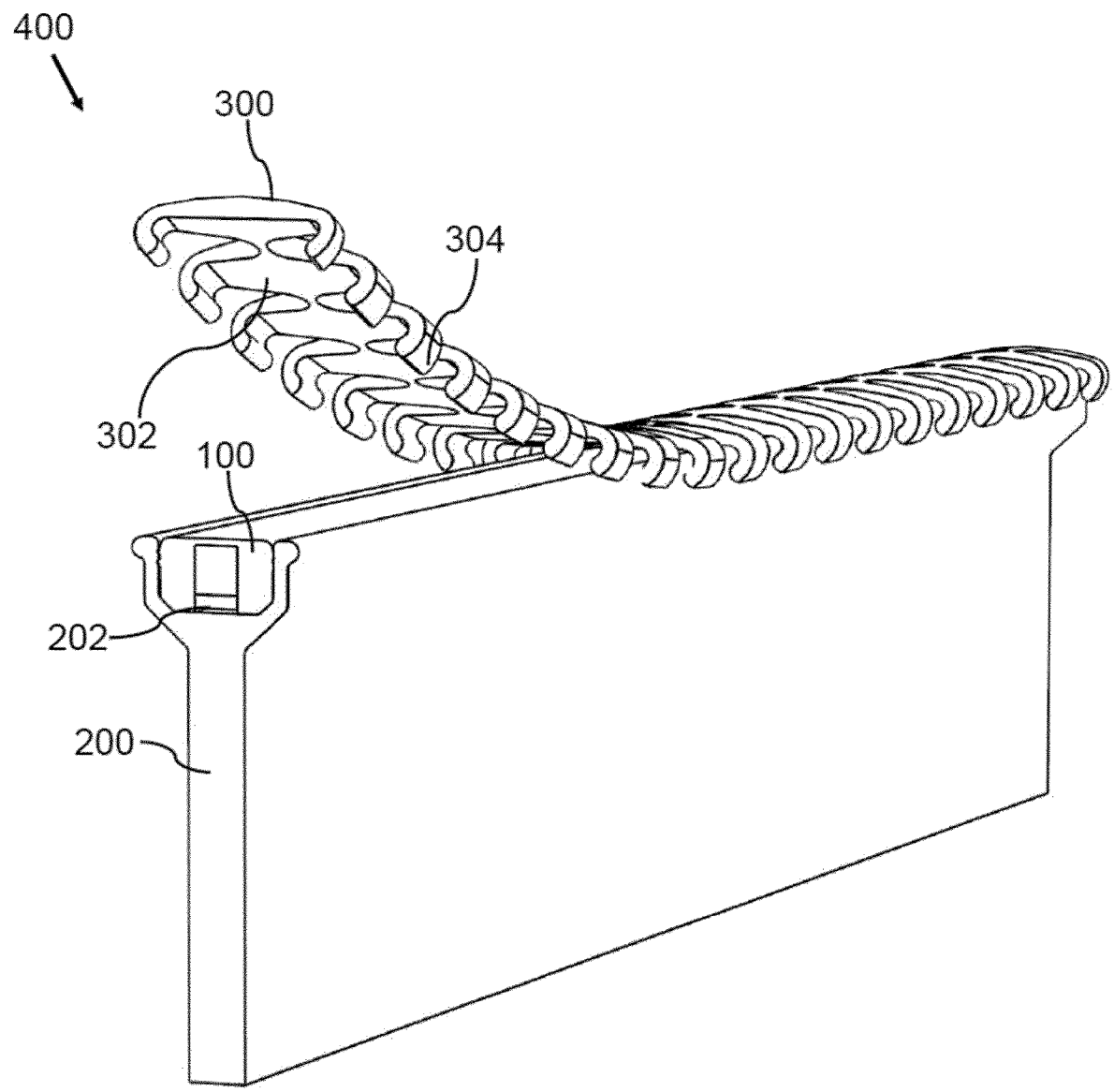
Figure 2:
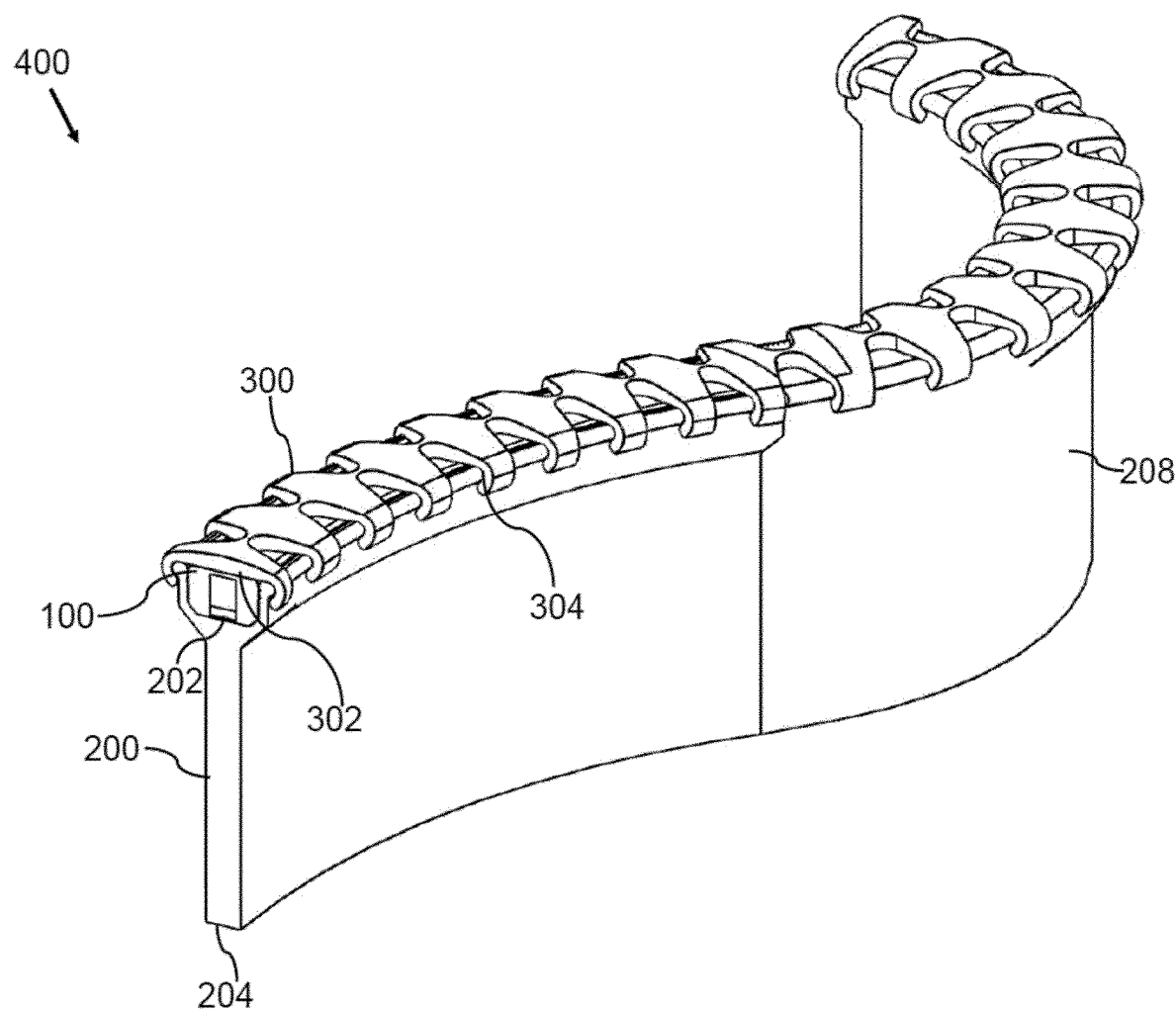
Figure 3:
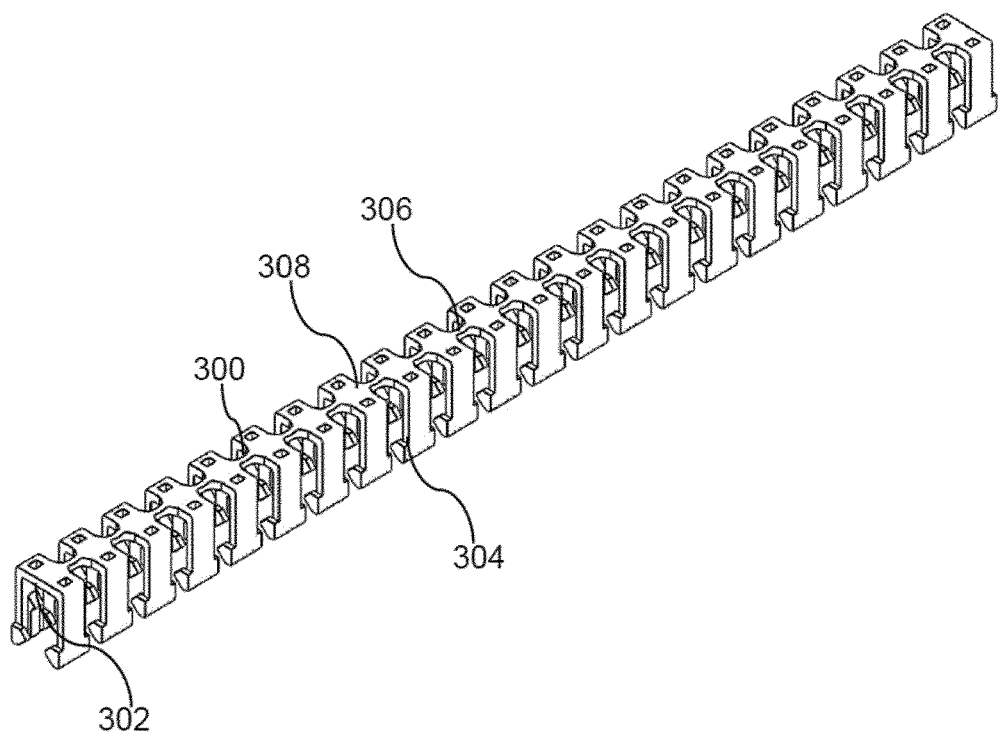
Figure 4:
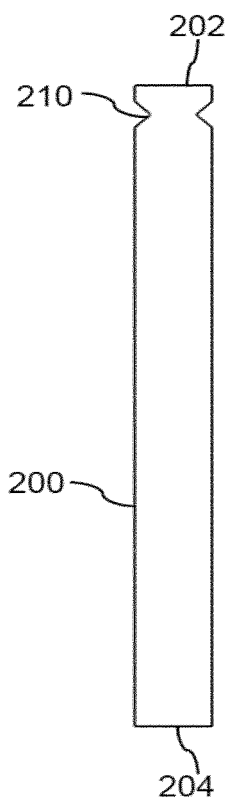
Figure 5:
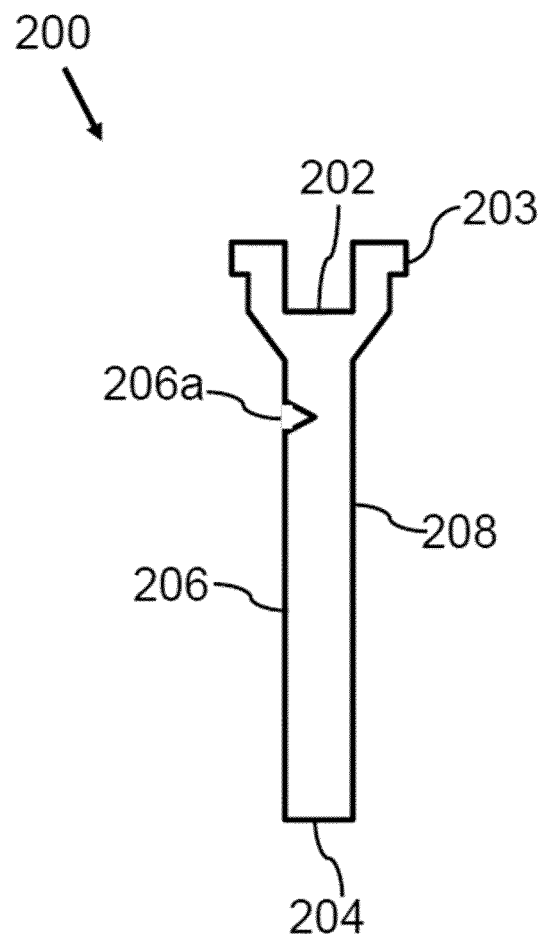
Figure 6:
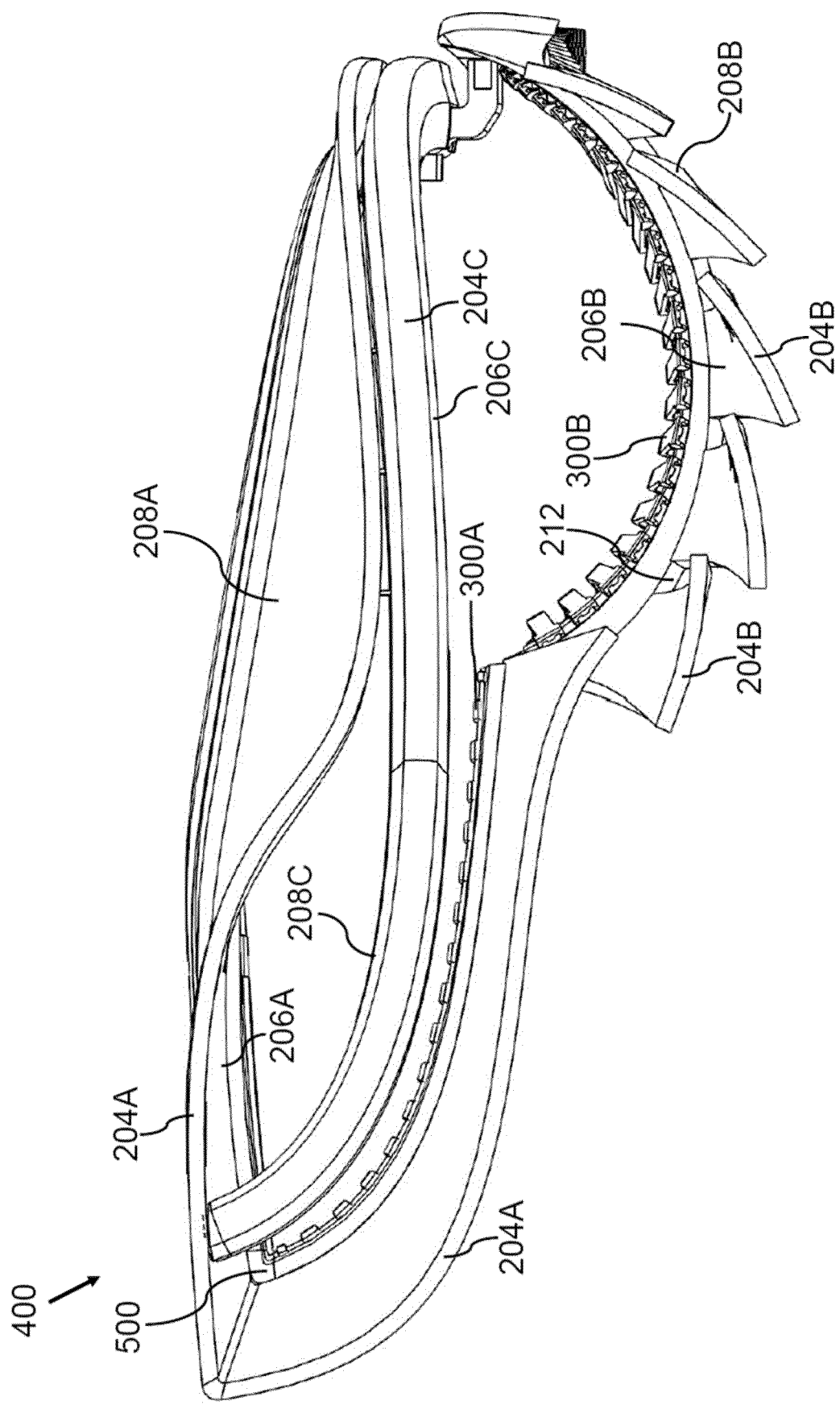
Figure 7:
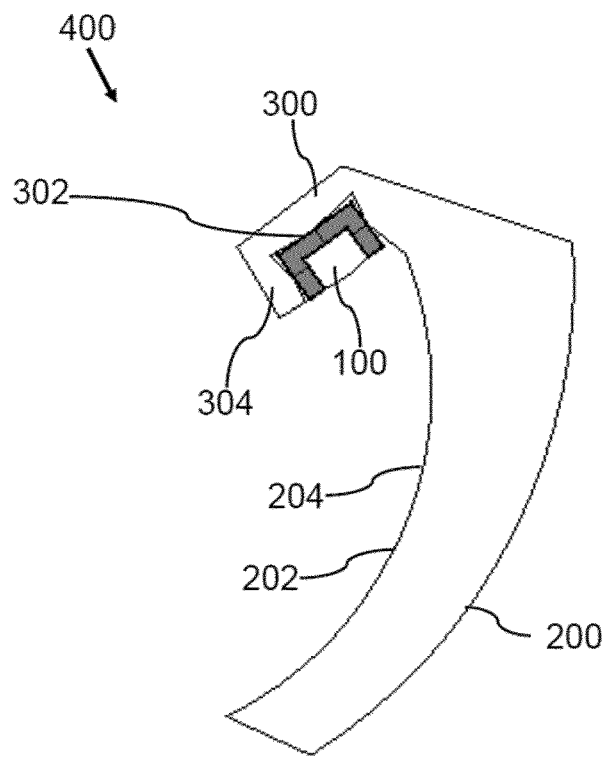
Figure 8:
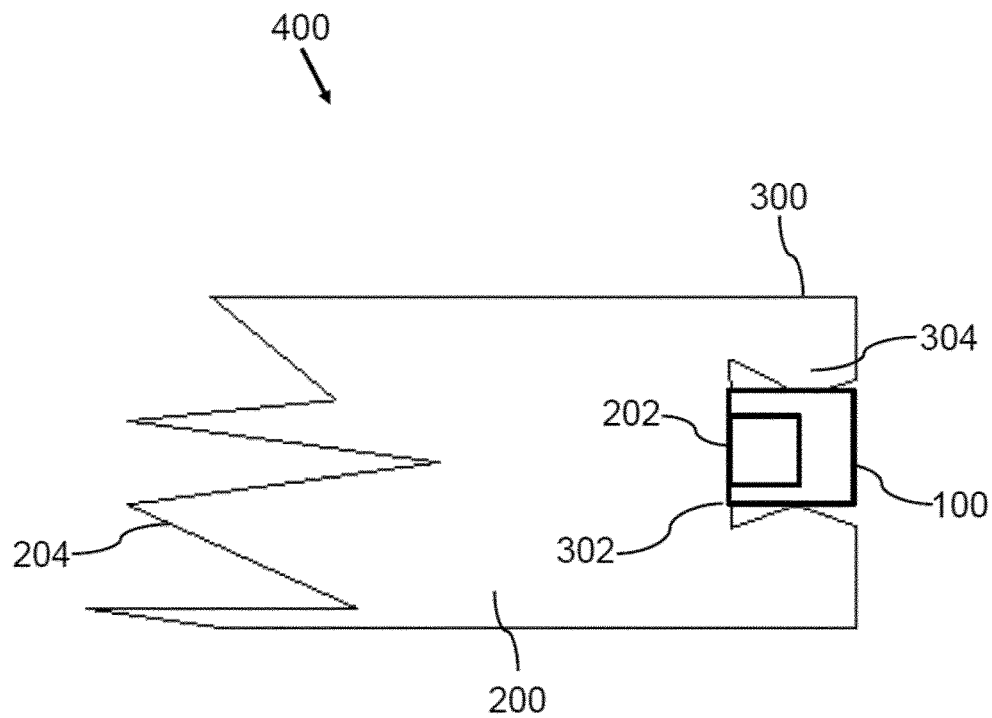
Figure 9:
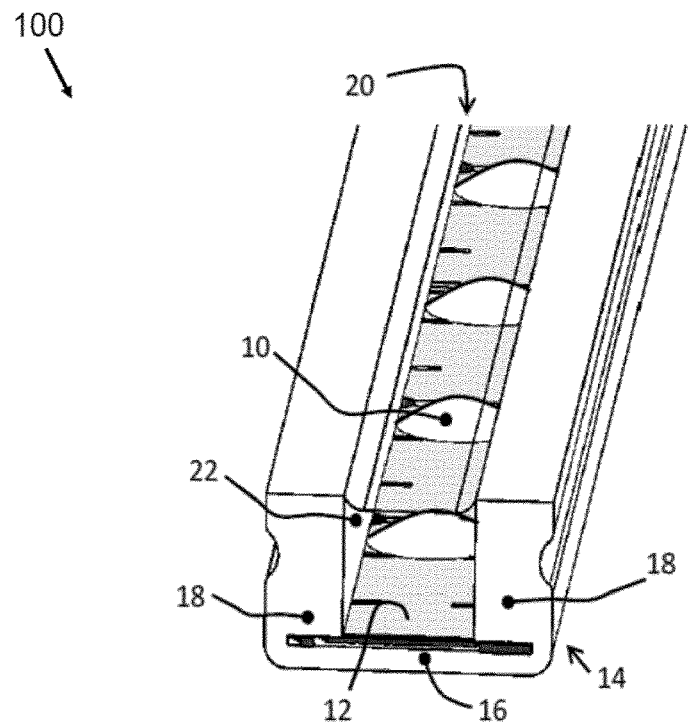
Figure 10:
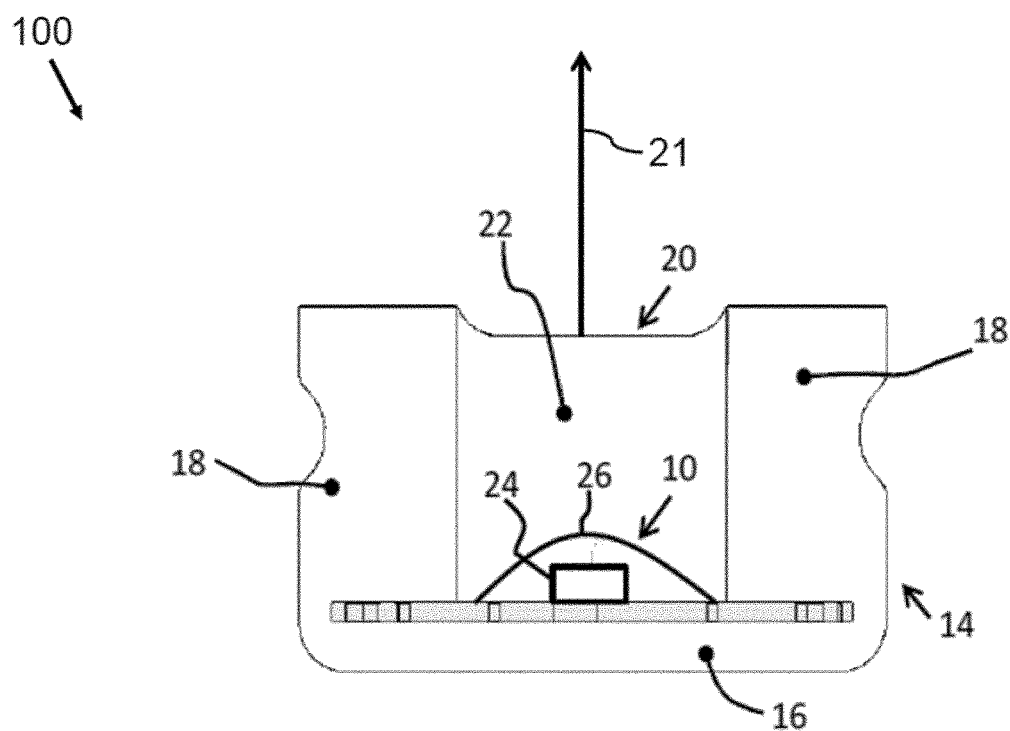
Figure 11:
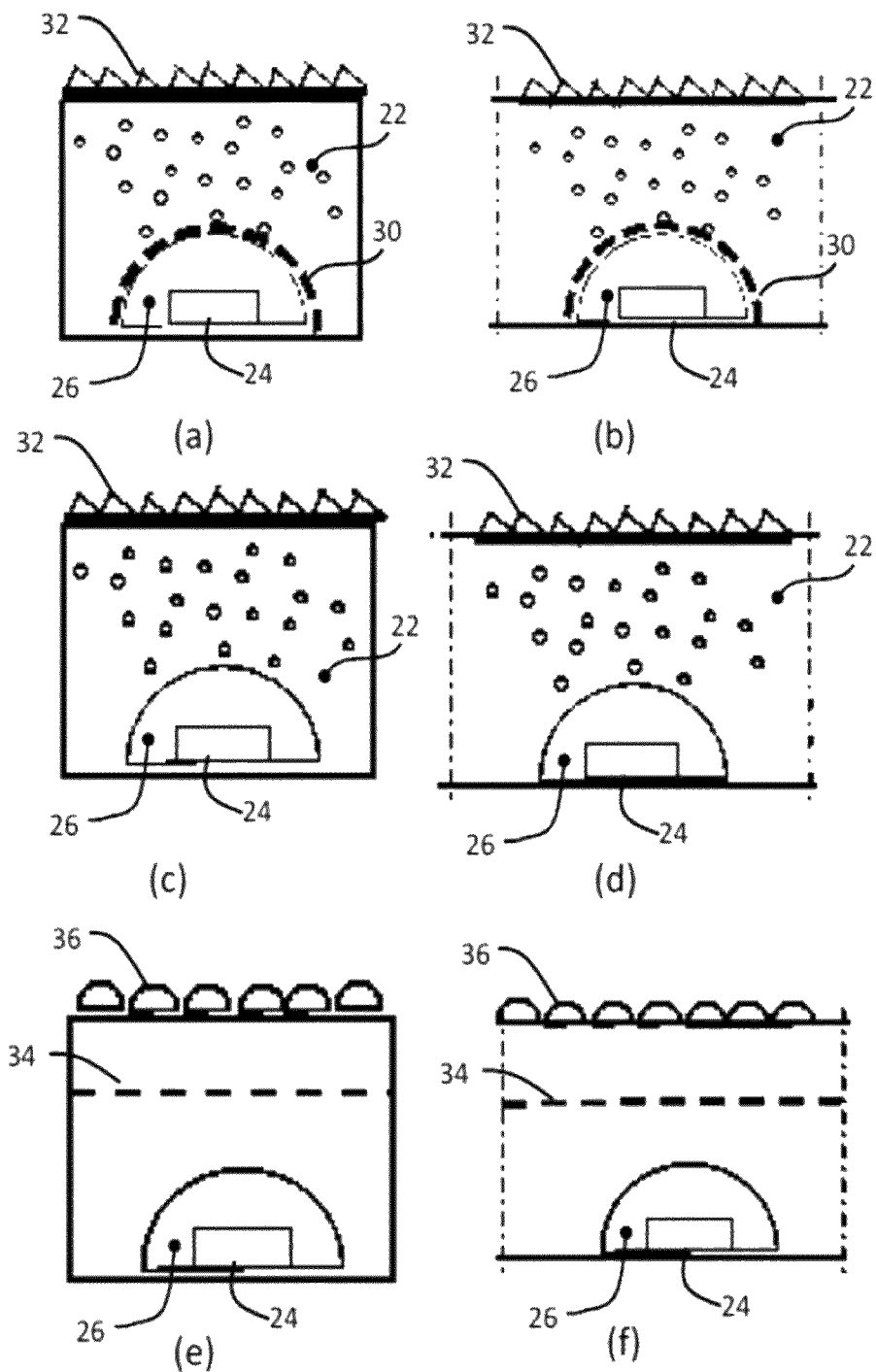

FIG. 1 shows a principal sketch of a first embodiment of a vehicle light assembly FIG. 2 shows a principal sketch of a second embodiment of the vehicle light assembly FIG. 3 shows a principal sketch of an embodiment of a separate coupling structure FIG. 4 shows a principal sketch of a first embodiment of a light guiding structure FIG. 5 shows a principal sketch of a second embodiment of a light guiding structure FIG. 6 shows a principal sketch of a third embodiment of the vehicle light assembly FIG. 7 shows a principal sketch of a fourth embodiment of the vehicle light assembly FIG. 8 shows a principal sketch of a fifth embodiment of the vehicle light assembly FIG. 9 shows a flexible lighting strip in perspective view FIG. 10 shows the lighting strip of FIG. 1 in cross section FIG. 11 shows a first set of different possible designs for the flexible layer used in the design of FIGS. 9 and 10

Figure 12:
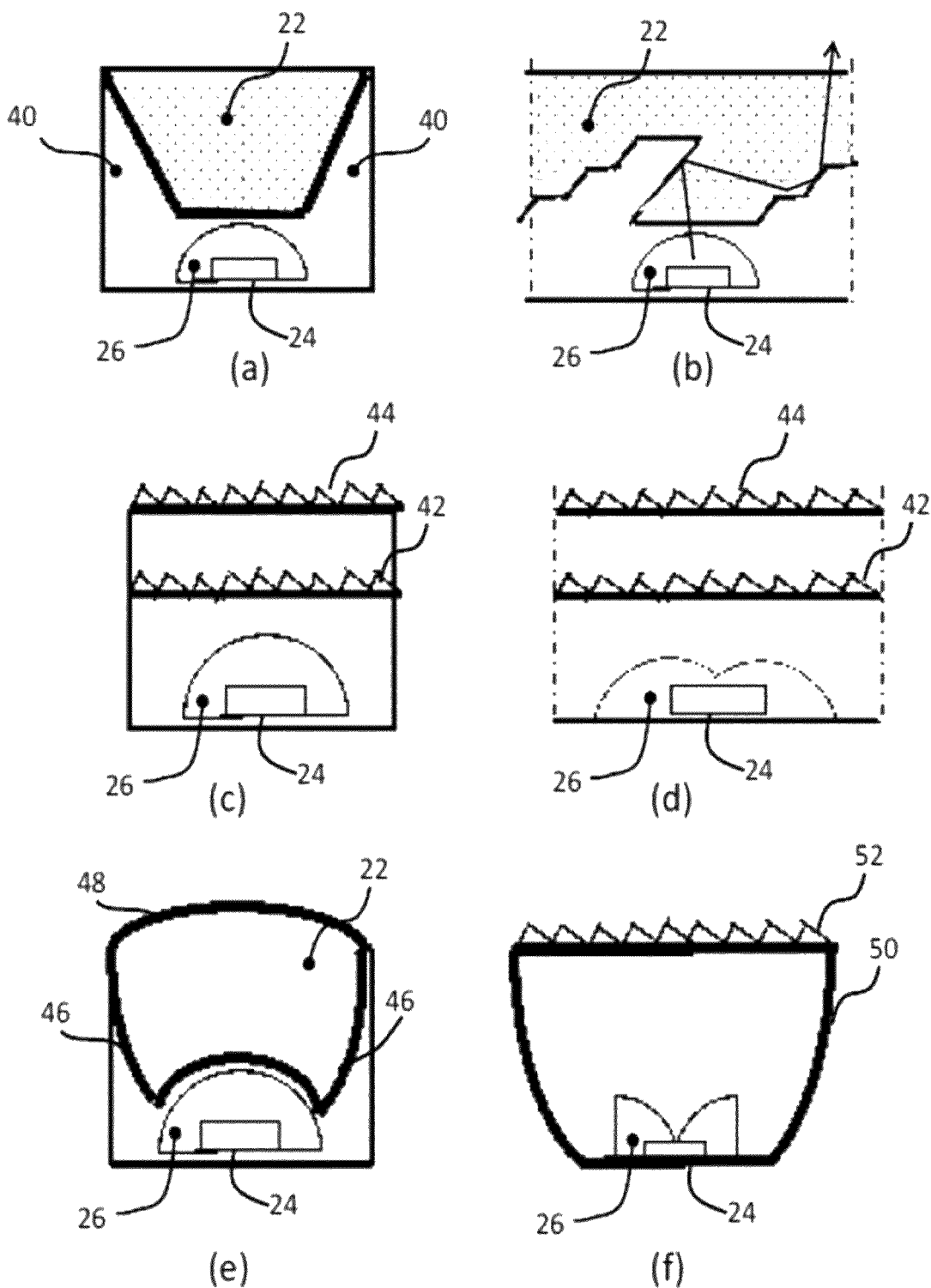

FIG. 12 shows a second set of different possible designs for the flexible layer used in the design of FIGS. 9 and 10

Figure 13:
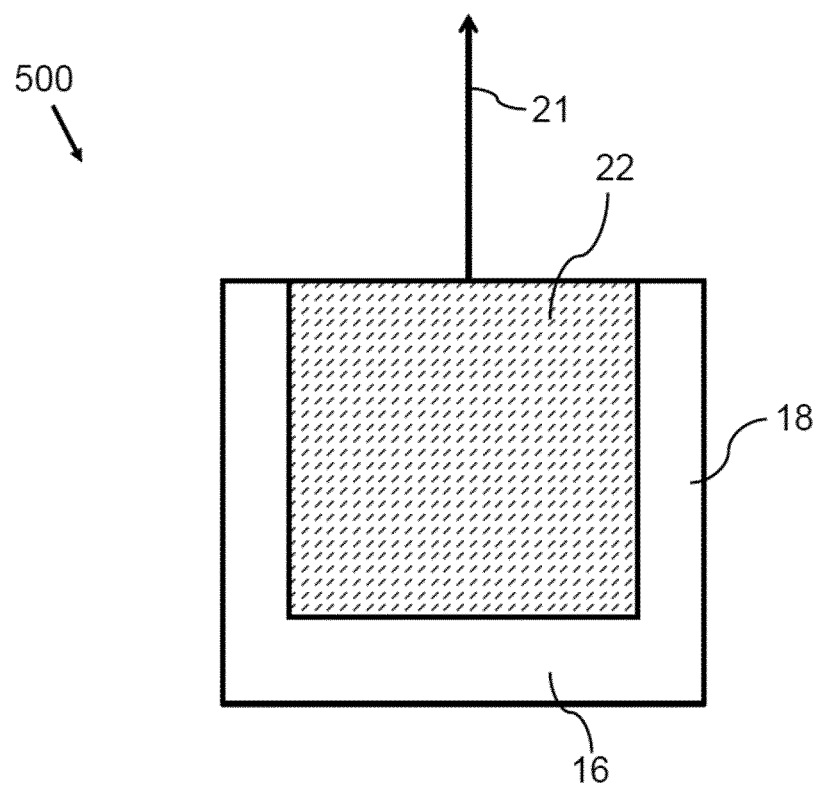
Figure 14:
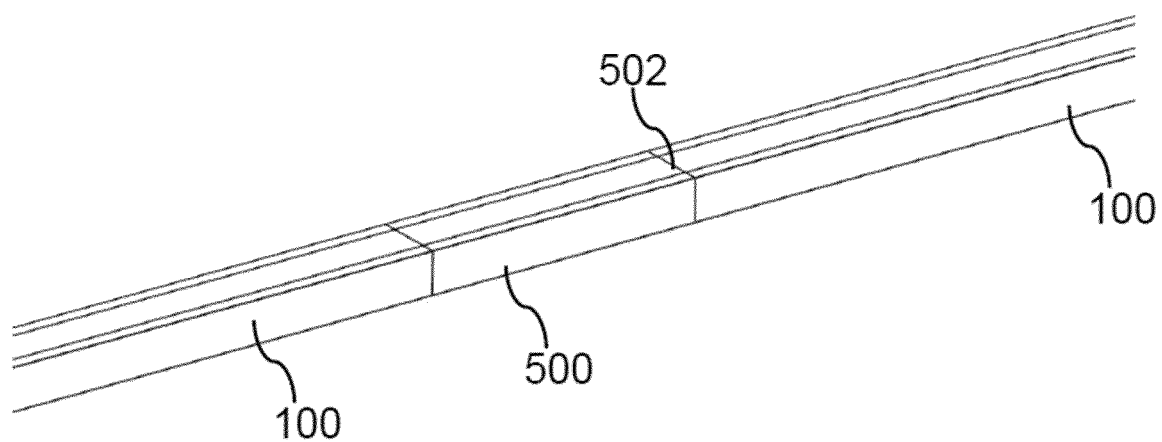
Figure 15:
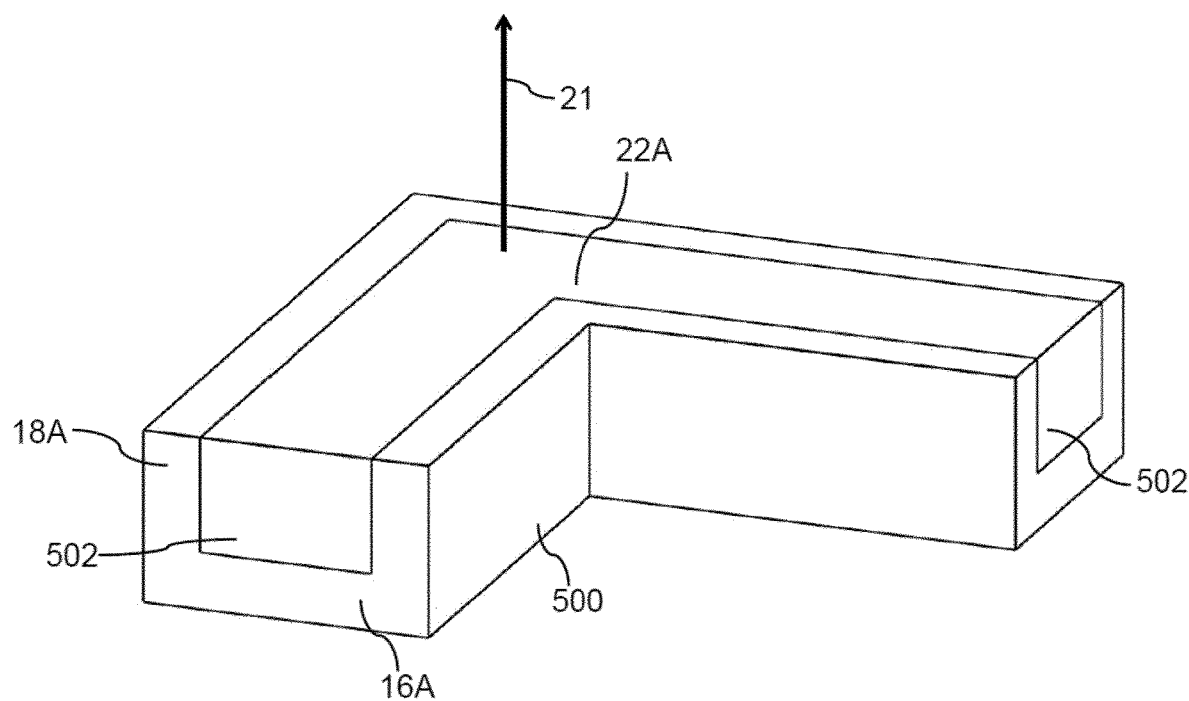
Figure 16:
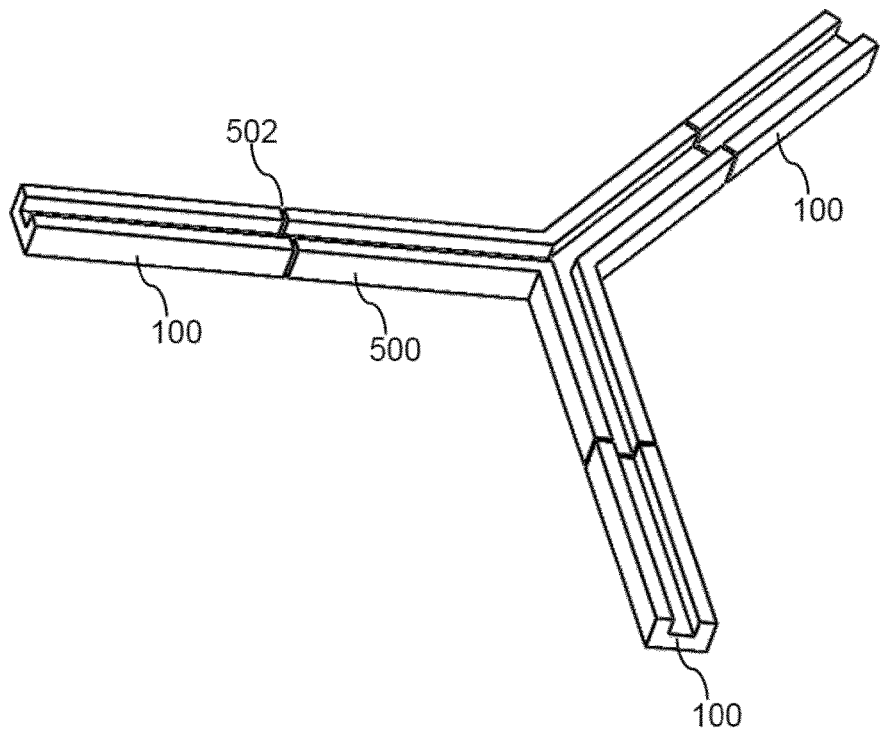
Figure 17:
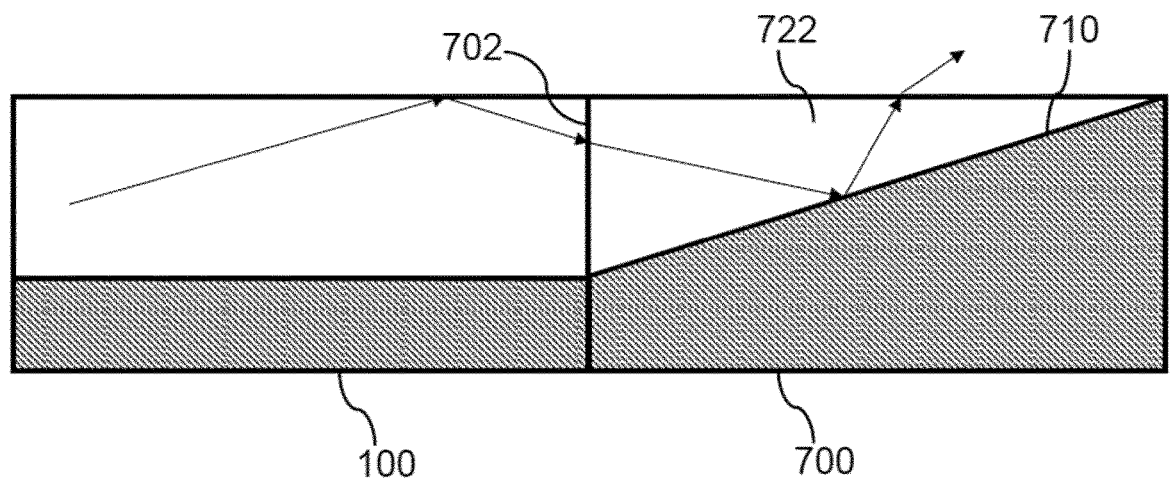
Figure 18:
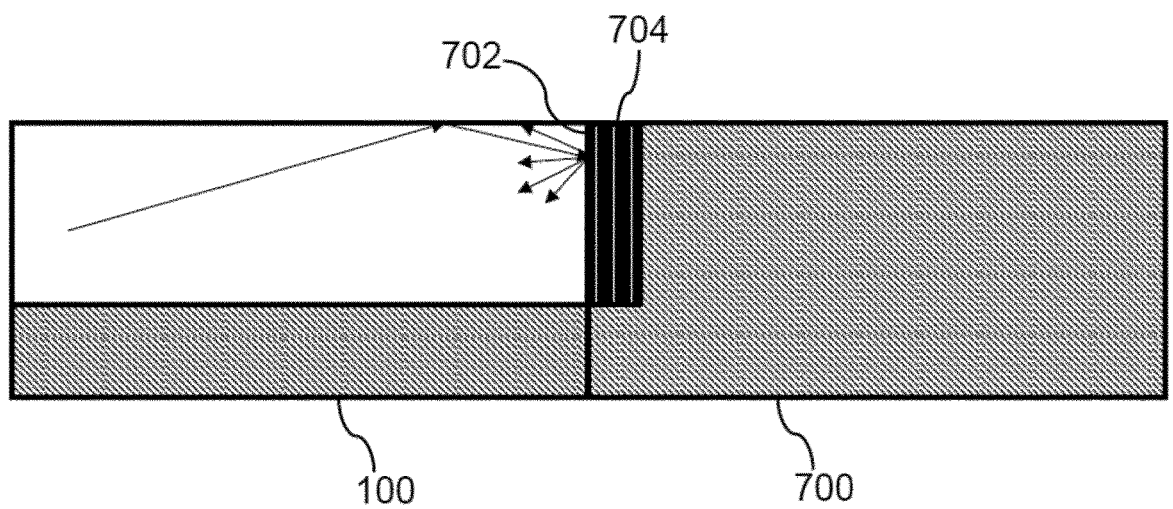
Figure 19:
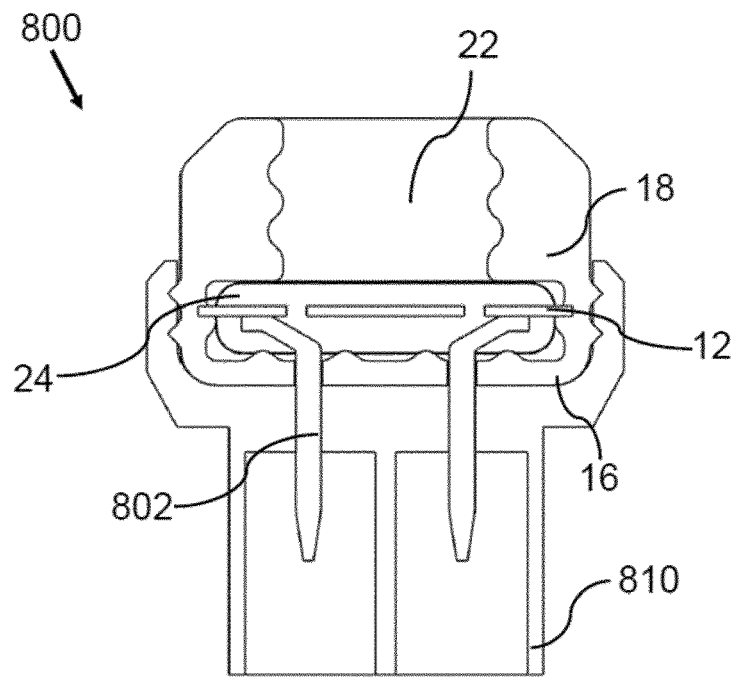
Figure 20:
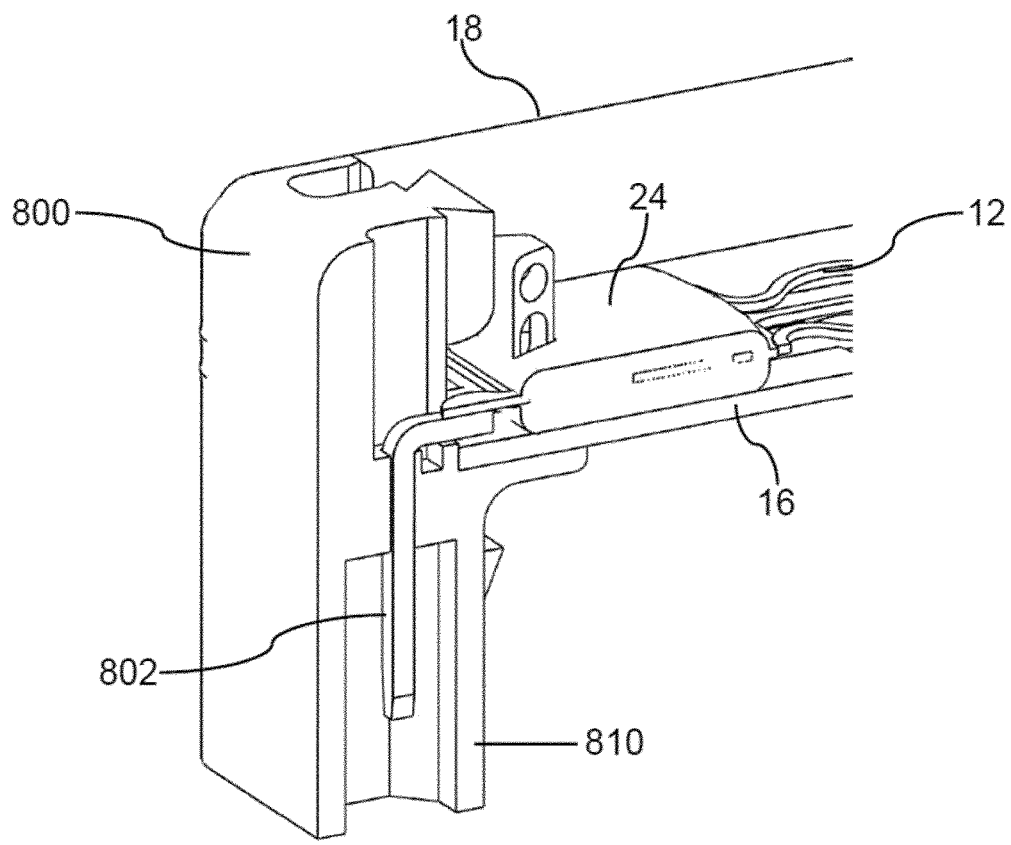
Figure 21:
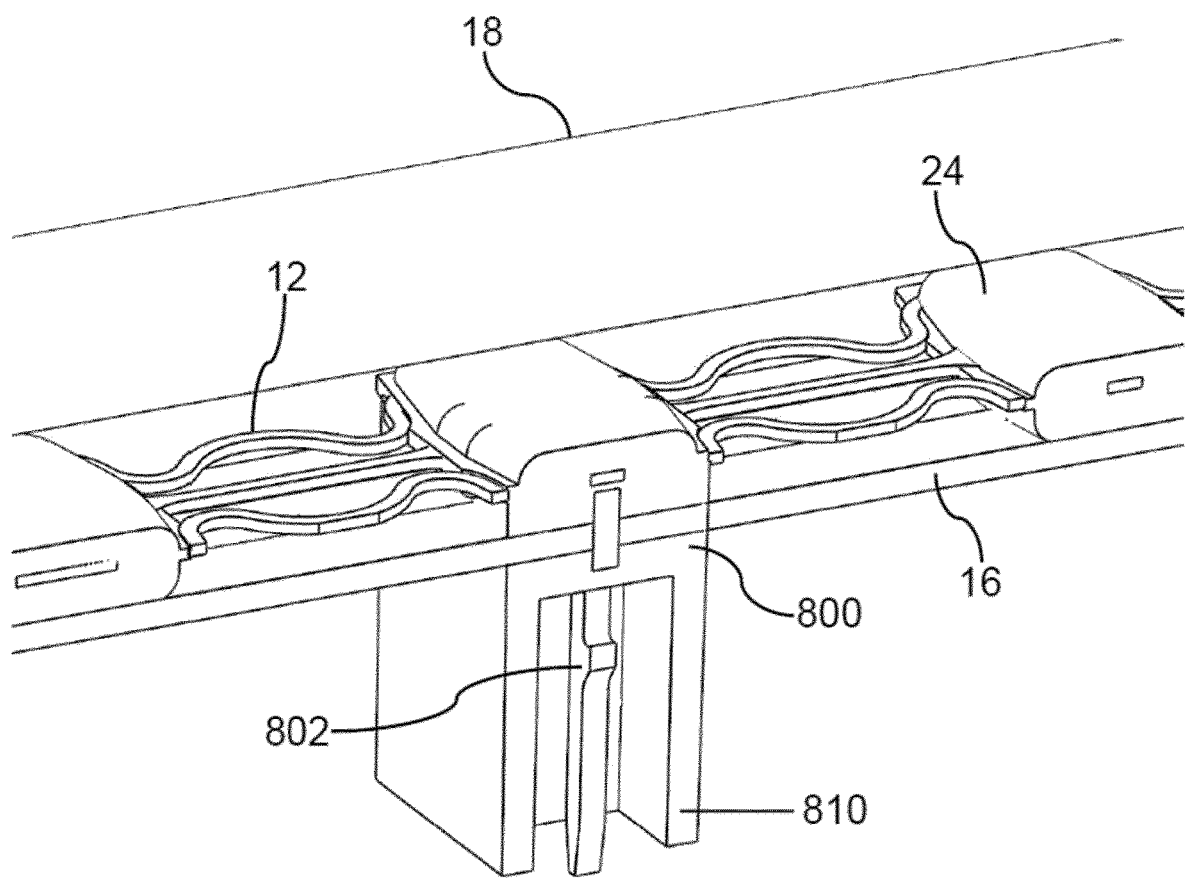

FIG. 13 shows a principal sketch of a cross-section a first embodiment of a connector FIG. 14 shows a principal sketch of a perspective view of the first embodiment of a connector FIG. 15 shows a principal sketch of a second embodiment of a connector FIG. 16 shows a principal sketch of a third embodiment of a connector FIG. 17 shows a principal sketch of a first embodiment of a lighting strip terminator FIG. 18 shows a principal sketch of a second embodiment of a lighting strip terminator FIG. 19 shows a principal sketch of a first embodiment of an electrical interface FIG. 20 shows a principal sketch of a second embodiment of the electrical interface FIG. 21 shows a principal sketch of a third embodiment of the electrical interface In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

FIG. 1 shows a principal sketch of a first embodiment of a vehicle light assembly 400. The vehicle light assembly 400 comprises a light guiding structure 200 which is in this case a light guide. The light guide comprises a slot in which the flexible light strip 100 is mounted. The flexible lighting strip 100 is fixed by means of coupling structure 300. A base of the flexible lighting strip 100 is placed on a mechanical coupling surface 302 of the coupling structure 300. Flexible tooth like fixing structures 304 of the coupling structure 300 fix the coupling structure 300 to the light guide by embracing corresponding bulges of the light guide. The flexible lighting strip 100 is arranged between the coupling structure 300 and the light guide such that the light emitted by the flexible lighting strip 100 is received by a light receiving surface 202 of the light guide.

FIG. 2 shows a principal sketch of a second embodiment of the vehicle light assembly 400. The basic configuration is similar as shown in FIG. 1 discussed above. The flexible lighting strip 100 is pressed in the corresponding slot of the light guide which is bended. Flexibility of the flexible lighting strip 100 is such that the flexible lighting strip is in this case mainly bended around an axis which is normal to the light receiving surface 202 (or to the light output surface of the flexible light guide 100 as described with respect to FIG. 10). The flexible coupling structure again enables reliable fixing of the flexible lighting strip 100. The light guiding structure 200 or the light guide comprises a primary emission surface 204 at a narrow side of the light guide and a secondary emission surface 208 at the wide side of the light guide (in this embodiment perpendicular to the primary emission surface 204). The light guide comprises scattering particles which are arranged to support light extraction via the secondary emission surface 208.

FIG. 3 shows a principal sketch of an embodiment of a separate coupling structure 300 similar as the coupling structures 300 shown in FIGS. 1 and 2. The coupling structure 300 comprises in this case a flexible plastic material which returns in its initial position as soon as there is no force forcing bending of the coupling structure 300. The coupling structure may be forced to bend by a curvature of a light guiding structure 200 as described with respect to FIG. 2. The coupling structure 300 may alternatively comprise a material which keeps the shape after being bended. The coupling structure 300 comprises in this embodiment clamp like fixing structures 304 with a clamping base 308. The clamping bases are connected by hinge structure 306 supporting flexibility of the coupling structure 300. A mechanical coupling surface 302 (e.g. for receiving the flexible lighting strip 100) is arranged in a channel formed by the clamps of the fixing structures 304.

FIG. 4 shows a cross-section of a first embodiment of a light guide which may be used as light guiding structure 200. The light guide is shaped like a blade similar as shown in FIG. 1 with a primary emission surface 204 at a narrow side of the blade opposite to a light receiving surface 202. The light guide or light blade further comprises coupling dents 210 which are arranged to receive, for example, the clamp like fixing structure 304 as described with respect to FIG. 3 in order to fix one or more flexible lighting strip 100 between the mechanical coupling surface 302 and the light receiving surface 202. The coupling dents 210 should be made as small as possible to prevent too much light loss due to frustrated total internal reflection (TIR).

FIG. 5 shows a principal sketch of a second embodiment of a light guide which may be used as light guiding structure 200. The light guide is shaped like a blade similar as discussed with respect to FIG. 4. The light guide further comprises secondary light emission surfaces 206 and 208 which are the wide sides of the light guide as discussed above with respect to FIG. 2. The secondary emission surface 206 further comprises a light outcoupling structure 206a which is a scratch in the surface of the secondary emission surface 206 supporting outcoupling of light received via the light receiving surface 202. The light guiding structure 200 further comprises a socket 203 which is arranged as coupling structure 300. The socket 203 is arranged to receive a flexible lighting strip 100 and to fix the flexible lighting strip 100. The light guiding structure 200 does therefore not need a separate coupling structure as discussed with respect to FIG. 1, 2 or 3. The bulk material of the light guide may alternatively or in addition include volume scatterers to tailor light outcoupling.

FIG. 6 shows a principal sketch of a third embodiment of the vehicle light assembly 400. The vehicle light assembly 400 comprises four flexible lighting strips which are not visible in FIG. 6. A first and a second flexible lighting strip are coupled by means of the connector 500 (see discussion above and below) around a corner and emit light to a light receiving surface of a first light guiding structure. The first light guiding structure is in this case a light guide with a first primary emission surface 204A and two first secondary emission surfaces 206A, and 208A which are arranged essentially opposite to each other. The first and the second flexible lighting strip and the connector are coupled to the first light guiding structure by means of a first coupling structure 300A which extends around a corner of the first light guide. A second light guiding structure is coupled to a third flexible lighting strip by means of a second coupling structure 300B which is fixed to first coupling structure 300A by mean of a mechanical interconnect (not shown the—first and the second light guiding structure may alternatively be one light guide manufactured by molding in order to support mechanical stability of the vehicle light assembly). The second coupling structure 300B fixes the third light guiding structure to the second light guide which comprises five notches 212 separating a second primary emission surface 204B in six discontinuous parts. The sixth discontinuous parts are surfaces of a fingerlike structures extending from a base of the second light guide which is coupled by means of the second coupling structure 300B to the third flexible lighting strip. These fingerlike structures are slightly twisted with respect to each other such that the parts of the second primary emission surface 204B are arranged in a scaled or fan arrangement. The second light guide comprises second secondary emission surfaces 206B, 208B which are discontinuous in the direction of the second primary emission surface is 204B and which are connected at the base of the light guide. The first, second, third flexible lighting strip and the first and the second light guide are arranged to build a taillight with brake light functionality. The first, second and third flexible lighting strip as well as the first and the second light guide are bended in all three dimensions such that the first and the second primary emission surfaces 204A, 204B as well as the first and the second secondary emission surface is 206A, 206B, 208A, 208B are visible for a driver of a car behind a car comprising the vehicle light assembly 400. The taillight essentially encloses a flashing light which comprises a fourth flexible lighting strip (not shown), a third coupling structure (not shown) and a light guiding structure which is a light guide with a third primary emission surface 204C and secondary emission surfaces 206C, 208C enclosing an angle of more than 90° with the third primary emission surface 204C. The light guides are arranged such that luminance of the primary emission surfaces 204A, 204B, 204C is higher than luminance of the secondary emission surfaces 206A, 206B, 246C, 208A, 208B, 208C. Especially the secondary emission surfaces 206A, 206B, 208A, 208B of the taillight provide a haze like appearance. The vehicle lighting assembly 400 may further comprise mechanical support structures in order to provide a reliable stability of the vehicle light assembly 400. The mechanical support structures may be integrated parts of the light guides. The combination of the flexible lighting strips, coupling structures and light guiding structures enables complex vehicle lighting assemblies.

FIG. 7 shows a principal sketch of a cross-section of a fourth embodiment of the vehicle light assembly 400. The light guiding structure 200 comprises in this case a reflective structure with a light receiving surface 202 which is at the same time diffusely reflective in order to reflect light received from a flexible lighting strip 100. The light receiving surface 202 coincides in this case at least partly with primary emission surface 204. The flexible lighting strip 100 is mechanically coupled to the light guiding structure 200 by means of a coupling structure 300 which comprises a slot with a mechanical coupling surface 302 and a fixing structure 304. The shape of the slot and the shape of the mechanical coupling surface 302 defines the shape and especially bending of the flexible lighting strip 100 which is not visible in the two-dimensional drawing. The fixing structure 304 fixes the flexible lighting strip 100 in the slot such that the shape of the flexible lighting strip 100 defines together with the illumination characteristic of the flexible lighting strip 100 illumination of the light receiving surface 202. The reflective surface may optionally comprise one or more areas which are not reflective. Light received at not reflective areas of the light receiving surface 202 may enter transparent carrier material which may be used to build the light guiding structure 200. Light entering the transparent carrier material may leave the transparent carrier material at defined surface sections (primary or secondary emission surfaces which are not shown) of the light guiding structure 200. The light guiding structure 200 may in this case be a combination of a reflective structure and a light guide.

FIG. 8 shows a principal sketch of a cross-section of a fifth embodiment of the vehicle light assembly 400. The light guiding structure 200 comprises in this case a scattering structure with a scattering element at the primary emission surface 204. The light guiding structure 200 comprises a transparent material such that the light received via a light receiving surface 202 can reach the scattering element. A flexible lighting strip 100 is mechanically coupled to the light guiding structure 200 by means of a coupling structure 300 which comprises a slot with a mechanical coupling surface 302 and a fixing structure 304. The shape of the slot and the shape of the mechanical coupling surface 302 define shape and especially bending of the flexible lighting strip 100 which is not visible in the two-dimensional drawing. A light emitting surface of the flexible lighting strip 100 is in this embodiment in contact with the mechanical coupling surface 302. The mechanical coupling surface 302 thus comprises the light receiving surface 202 of the light guiding structure 200. The fixing structure 304 fixes the flexible lighting strip 100 in the slot such that the shape of the flexible lighting strip 100 defines together with the illumination characteristic of the flexible lighting strip 100 illumination of the light receiving surface 202 and the scattering element at the primary emission surface 204. It is thus not necessary that the light receiving surface 202 touches the flexible lighting strip 100. There may, for example, be an air gap between the light receiving surface 202 and the light emitting surface of the flexible lighting strip 100. Fixing structure 304 and mechanical coupling structure 302 may, for example, in such a case be the same.

FIGS. 9, 10, 11 and 12 show a flexible elongate lighting strip having at least one line of LEDs mounted on a flexible support and carried by a carrier structure 14. The carrier structure 14 provides light mixing within a channel over the line of LEDs and a flexible layer is provided in the channel for further light processing.

FIG. 9 shows a flexible lighting strip 100. A line of LEDs 10 is mounted on an elongate, flexible support 12. The flexible support 12 is supported by the carrier structure 14 having a flexible base 16 on which the flexible support 12 is mounted and flexible side walls 18 to each side of the flexible support 12, defining a channel 20 over the base 16.

The channel may have parallel sides as shown, by they may instead taper, with a wider top opening than the base. This forms a funnel shape.

The base and side walls are preferably part of a single integrated component, which itself may be extrusion molded. It may be molded around the support 12, or else the carrier structure 14 may be fitted around the support 12 after manufacture. Alternatively, the carrier structure 14 may comprise separate side walls and base which are assembled together.

The flexible support 12 provides the electrical connections to the LEDs 10 and also provides heat removal.

The LEDs 10 emit light into the channel 20, and in some examples the surfaces of the side walls 18 provide light mixing so that a more uniform strip of illumination is defined. The height of the channel together with the reflection characteristics of the side walls define a beam shaping function, whereby the light output intensity is greater in the normal direction (perpendicular to the support 12).

A flexible layer 22 is provided in the channel. This layer performs an additional light processing function. This function is to make the light output more uniform, so that the spot-like appearance of the LEDs is made less visible, and/or to increase the collimation and thereby provide directional control.

All of the components (apart from the LEDs themselves) are flexible so that the complete strip may be deformed into almost any desired 3D configuration. It may be bent into an arc on a flat plane (parallel to the support 12) or it may be deformed into an arc out of plane. The lighting strip may be mass produced as a small range of designs (for example of different dimensions and materials), and each design may then be suitable for a large range of end applications.

The top of the channel, which may be defined by the top of the flexible layer 22, defines the light output surface, which is in a strip shape.

The optical function of the layer 22 may be implemented by a scattering arrangement. The scattering may be uniform along the strip or there may be different scattering intensities at different points in the volume of the layer, for example by having a variation in the volume density of scattering particles. The different scattering intensities may vary periodically to match the spacing between the LEDs. The scattering intensity may also vary in the normal direction. The flexible layer thus may be used to provide shaping of the light output from the LEDs and homogenization of the light.

The flexible layer also provides protection to the electrical tracks carried by the flexible support 12.

The scattering function may be used to generate a specific desired beam. Many beam variations are possible by suitable selection of the layer 22, even for a design which remains identical in all other respects. In this way, only one component is varied to achieve a wide range of possible designs. A number of specific examples of design for the flexible layer are presented below.

FIG. 10 shows a cross section perpendicular the length direction. It shows that the LED comprises an LED chip 24 and an optional output structure 26. The LED chip 24 may be a direct color emitting chip (i.e. the output of the chip is a desired color to be emitted from the lighting strip). Alternatively, the LED chip may emit one color and a phosphor converter may be provided for changing the output color. For example, the LED may be a blue chip, and a yellow emitting phosphor is used to create a white light output.

This phosphor converter may be part of the chip which is mounted on the flexible support 12, or it may be defined by the output structure 26.

The output structure may instead or additionally provide a beam shaping function, and be formed as a refractive lens.

In all cases, the output structure 26 provides protection to the chips.

By way of example, the overall product (the outer dimensions of the carrier structure 14) may be a width 8 mm and a height 5 mm. The channel may then have dimensions of 3 mm×3 mm.

In general, the lighting strip may have a width less than 20 mm, more preferably less than 10 mm, and a height less than 12 mm more preferably less than 8 mm. The strip can have any length, for example tens of centimeters.

There may typically be tens to hundreds of LEDs along the line. They may for example be spaced with a pitch of between 2 mm and 50 mm, for example between 2 mm and 30 mm, for example between 5 mm and 20 mm.

Some examples of the materials and designs that may be used to form the different components will now be discussed.

The flexible support 12 may comprise a flexible printed circuit board or a flexible electrical connection structure (e.g. lead frame). A flexible printed circuit board may for example be made of polyimide with copper tracks, although many other flexible carrier materials may be used. A flexible electrical connection structure may be formed of a sheet metal, such as Cu, Al, Zn, Fe or alloys.

In either case, the support carries the LEDs and electrical tracks and is able to be deformed to adopt a desired shape. The flexible support 12 may be carried directly over the base 16 of the carrier structure 14, or there may be additional layers of material, for example for heat spreading.

As mentioned above, the LED may include a wavelength converting layer. This may be formed as part of the LED itself so that the discrete LED to be mounted on the flexible support 12 incorporates a phosphor layer. It may instead be a separate component mounted over the LED, for example a rigid plastic capsule which contains the phosphor converter. The LED package may also include electronic components such as basic components like resistors, or more complicated components such as sensors or integrated circuits, The output structure 26 may comprise a silicone glob, or a molded part formed from rigid plastic. It may instead by formed by a dam and fill process. The output structure may comprise the phosphor as explained above, or it may be translucent (and just serve as a protection layer), or it may provide an optical beam shaping function.

The carrier structure 14 may be formed from a flexible white material or a white-coated material or a mirror-coated material, so that the side walls mix the light within the channel by scattering of light at the channel sides. In this way, a continuous strip of illumination may be formed. However, discrete light output points may instead be visible if desired. The carrier structure 14 may be formed from extruded silicone, although other bendable materials are also possible. The carrier structure 14 may also be selected as a thermally conductive material to provide a heat dissipation function.

Note that in some examples light may not reach the side walls because of total internal reflection at the sides of the flexible layer which is within the channel. For example, there may be an air gap between the sides of the flexible layer, and total internal reflection may then take place at the layer-air interface. In this case, the carrier 14 does not need reflecting side walls.

The flexible layer 22 may comprise an extruded component such as silicone. In this case, it may be fitted mechanically into the channel. It may instead be formed in the channel, for example as a liquid which is then cured in place.

An upper surface of the flexible layer 22 defines the light output surface of the flexible lighting strip 100. A (local) normal 21 to the light output surface defines a primary direction of light emission of the flexible lighting strip 100. The normal 21 is essentially parallel at every point of the light output surface as long as the flexible lighting strip 100 is not bended. The flexible lighting strip 100 can especially be bended around the normal 21. Bending around the different axes may be limited by the geometry of the flexible lighting strip 100, the width and height of the flexible lighting strip 100 or the material properties of the different elements of the flexible lighting strip 100.

FIG. 11 shows three examples of possible design for the flexible layer.

FIG. 11(*a*) shows the first design in cross section across the channel and FIG. 11(*b*) shows the first design in cross section along the channel.

The output structure comprises a transparent glob. There is a coating 30 on the glob, for example a white paint pattern. The layer 22 is a filling which fills the channel. It has scattering particles dispersed throughout. These may for example be applied as a dye. The top of the filling is covered with an exit film 32 with linear prisms or a Fresnel structure.

The white pattern on top of the transparent glob makes the light more uniform within the channel in a first step. The glob functions as a larger secondary light source than the chip itself.

FIG. 11(*c*) shows the second design in cross section across the channel and FIG. 11(*d*) shows the second design in cross section along the channel.

The output structure 26 again comprises a transparent glob. The layer 22 again has the structure of a filling with scattering particles dispersed throughout. The top of the filling is covered with an exit film 32 with linear prisms or a Fresnel structure. This second design is thus the same as the first but without the coating on the protective glob.

FIG. 11(*e*) shows the third design in cross section across the channel and FIG. 11(*f*) shows the third design in cross section along the channel.

The output structure 26 again comprises a transparent glob. The layer 22 comprises an optical processing film 34 with partial transmittance, for example a reflector film with a hole array. An exit film 36 comprises a lens array.

FIG. 12 shows four further examples of possible design for the flexible layer.

FIG. 12(*a*) shows the fourth design in cross section across the channel and FIG. 12(*b*) shows the fourth design in cross section along the channel.

The output structure 26 again comprises a transparent glob. The layer 22 is shaped structure which does not fill the channel in the sideways direction. Instead, air gaps 40 are present at the sides and beneath. The cross section varies along the length so that a beam shaping function is dependent on the position along the length of the channel. This enables a more uniform light output to be created along the length of the channel. In particular, total internal reflections are used to pass light along the layer 22 in the manner of a light guide, with the light escaping at locations along the top of the channel which are remote from the light sources themselves.

FIG. 12(*c*) shows the fifth design in cross section across the channel and FIG. 12(*d*) shows the fifth design in cross section along the channel.

The output structure 26 again comprises a transparent glob, but rather than having the form of a single lens shape, it has a double lens shape along the length axis of the channel. This serves to make the light output more uniform in the length direction. The layer 22 comprises a prismatic or Fresnel film 42, and there is a further prismatic or Fresnel exit film 44. These films combine to implement a collimation function.

The flexible layer may thus comprise a multi-layer structure. In the example of FIGS. 12(*c*) and 12(*d*), the multiple layers may be the same material but with different surface structures. They may instead be formed from different materials, or they may be formed as layer (of the same or different materials) with different optical coatings.

FIG. 12(*e*) shows the sixth design in cross section across the channel. It is extruded along the channel so no cross section along the channel is shown.

The output structure 26 again comprises a transparent glob. The layer 22 is shaped structure which does not fill the channel in the sideways direction. Instead, air gaps 46 are present at the sides and beneath. The cross section is constant along the length. Total internal reflections are used to shape the light, for example at the top of the channel a lens shape 48 is defined.

FIG. 12(*f*) shows the seventh design in cross section across the channel. It is extruded along the channel so no cross section along the channel is shown.

The output structure directs the light in a sideways direction. The design includes a so-called dark hole optic, in which the output structure has a high reflective coating on top, shaped to reflect light to the sides, leaving a central dark hole. The lateral light is reflected by the side walls 50 of the channel, which in this example are curved rather than straight. These side walls thus perform a light shaping function. There is a prismatic or Fresnel exit film 52.

It will be seen from the examples above that the layer may be clear or diffusive, and it may be formed as a multi-layer structure. It may have scattering elements and/or it may have diffractive elements. In the case of a multi-layer structure, the multiple layers may be formed from different materials or materials with different optical coatings. There may be refractive, diffusive, diffractive or reflective optical elements incorporated into the layer. Optical films may also be incorporated into the layer. Alternatively, the main volume of the channel may be empty, and the layer comprises only a top exit layer or a layer within the channel.

The overall design is created to generate desired characteristics of the light emitted from the strip. This light may be collimated or diffuse, uniform or shaped into discrete output regions.

The example above shows one line of LEDs along the strip. There may however by multiple lines of LEDs. Electrical connection to the LEDs may be made from one or both ends of the strip, or from the back, through an opening in the base 16. The electrical connection to the lighting strip has not been shown as any conventional PCB or lead frame connector may be used.

The LED driver electronics may be external to the lighting strip or it may be integrated within the lighting strip.

FIG. 13 shows a principal sketch of a cross section of a first embodiment of a connector 500. The cross section shows a carrier structure with a flexible base 16 and flexible side walls 18 building a channel as discussed with respect to the flexible lighting strip shown in FIG. 10. The channel is filled with a flexible layer 22 in order to distribute light received from flexible lighting strips via a coupling interface (not shown). The received light is emitted via a light output surface of the flexible layer 22 with a main emission direction along a local normal of the light output surface 21. The connector 500 may optionally comprise a carrier structure with, for example, a flexible electrical connection structure (not shown) in order to enable electrical connection of two or more flexible lighting strips optically and mechanically coupled by means of the connector.

FIG. 14 shows a principal sketch of a perspective view of the first embodiment of a connector 500. The connector 500 is arranged to connect two identical flexible lighting strips 100 in a linear arrangement by means of two coupling interfaces 502. Length, reflectivity and scattering properties of the base, the side walls and the layer within the channel defined by the base and the side walls are arranged such that luminance of a light emission surface of the connector 500 is essentially the same than luminance of the coupled flexible lighting strips 100. The material of the base and side walls may be flexible or rigid depending on the intended arrangement of the vehicle light assembly. A flexible material may enable to bend the two flexible lighting strips 100 optically and mechanically coupled by means of the connector 500 across the connector 500.

FIG. 15 shows a principal sketch of a perspective view of a second embodiment of a connector 500. The general configuration of the connector 500 is the same as discussed with respect to FIG. 13. A rigid base 16A and two rigid sidewalls 18A form a channel with a rectangular corner. The channel may be formed by means of an aluminum profile. The channel is filled with a transparent rigid layer 22A which comprises two coupling interfaces 502. The material of the transparent rigid layer 22A may, for example, be a transparent plastic. The connector 500 enables a connection of two flexible lighting strips 100 at an angle of 90° by coupling the flexible lighting strips 100 to the coupling interfaces 502. Other configurations of such edge connector may enable a connection at different angles than 90° (e.g. at an acute angle or obtuse angle). Reflectivity of the rigid base 16A and the rigid side walls 18A in combination with a defined scattering within the rigid layer 22A and the length of the arms of the edge connector are preferably arranged that a homogeneous luminance of the combination of the flexible lighting strips and the edge connector is enabled. The edge connector may alternatively comprise flexible materials as discussed with respect to FIG. 13.

FIG. 16 shows a principal sketch of a third embodiment of a connector 500 which is arranged to connect three flexible lighting strips 100 by means of corresponding coupling interfaces 502. The general configuration of the connector 500 is similar as described with respect to FIG. 13. The base and side walls and optionally the transparent material placed in the channel formed by the base and side walls are in this case made of a rigid material such that the Y shape form of the connector 500 is fixed. Length of the three arms of the connector is adapted such that light outcoupling via a light output surface of the connector is such that luminance of the light output surface of the flexible lighting strips 100 and the connector 500 is essentially the same. Alternatively, length and outcoupling of light entering connector 500 may be arranged to provide, for example, a smooth transition between flexible lighting strips with different luminance. Furthermore, connector 500 may be arranged to provide a defined lighting effect (e.g. highest luminance at the crossing of the branches or arms of connector 500).

FIG. 17 shows a principal sketch of a cross section an embodiment of a lighting strip terminator 700. The lighting strip terminator comprises a coupling interface 702 in order to receive light (indicated by the arrows) from a flexible lighting strip 100. The lighting strip terminator 700 comprises a base, side walls and a layer for distributing the light between the side walls similar as discussed with respect to the connector 500 or the flexible lighting strip 100 above.

The difference is that in this embodiment there is a wedge arranged in the channel between the side walls such that light received from the flexible lighting strip 100 is reflected in the direction of a light output surface of the lighting strip terminator 700 which is built by a surface of the layer as discussed above. The preferably diffuse reflection by means of the base and the side walls is arranged such that luminance of the light output surface of the lighting strip terminator 700 is homogeneous and essentially the same as luminance of the flexible lighting strip 100 coupled to the lighting strip terminator 700. Scattering particles may optionally be added to the material of the layer in order to provide a defined luminance of the light output surface of the lighting strip terminator 700. The tapered shape of the base can also be more rounded, e.g. parabolic or another optimized shape in order to direct the light more forwards out of the light output area of the lighting strip terminator 700. Essential here is that the light can run until the end of the light strip terminator.

FIG. 18 shows a principal sketch of a second embodiment of a lighting strip terminator 700. The lighting strip terminator 700 is in this embodiment made of a piece of hard plastic or aluminum. It has a flat surface (coupling interface) that faces an end face (coupling interface) of a flexible lighting strip 100. This flat surface comprises a reflector 704 which is highly specularly reflective reflecting the light back into the flexible lighting strip 100. In this way light that would otherwise be lost/absorbed is injected back into the light guide of the flexible lighting strip 100 and has a second chance of being emitted from the light output surface. The highly reflective face of the lighting strip terminator 700 is typically made of highly polished aluminum or coated silver foils. Also special highly reflective foils like Alanod may be used. The distance between the end face of the flexible lighting strip 100 and the middle of the next LED is preferably half of the distance between two LEDs of the flexible lighting strip 100 such that the specular reflective reflector 704 has the same effect as a further LED at the opposite side of the reflector 704 (virtually within the lighting strip terminator 700).

FIG. 19 shows a principal sketch of a cross-section of a first embodiment of an electrical interface 800. The cross section shows a cross-section of the flexible lighting strip as discussed with respect to FIG. 10 with a flexible base 16 flexible side walls 18 and a flexible layer deposited in the channel formed by the base 16 and flexible side walls 18 as discussed above. An LED chip 24 is electrically connected by means of the flexible support 12 comprising the flexible electrical connection structure. Electrical connection pins 802 are arranged to electrically connect the conducting paths of the flexible electrical connection structure. A body of the electrical interface 810 surrounds the electrical connection pins 802 such that in this embodiment a female plug is formed. The female plug can be connected by means of a corresponding male plug such that electrical power can be provided by means of a wire connected to the female plug. The other end of the wire can be provided with any suitable plug or electrical connection technology which may be beneficial in the corresponding application in a rear light or front light.

FIG. 20 shows a principal sketch of a second embodiment of the electrical interface 800. The general configuration is essentially the same as discussed with respect to FIG. 19. The electrical interface 800 is arranged at one of the longitudinal end surfaces of a flexible lighting strip. Such an electrical interface 800 may be used if one end of a flexible lighting strip is essentially invisible in a vehicle light assembly.

FIG. 21 shows a principal sketch of a third embodiment of the electrical interface 800. The general configuration is essentially the same as discussed with respect to FIG. 19. The electrical interface 800 is arranged at an intermediate position of a flexible lighting strip. Such an electrical interface 800 may be used if both ends of a flexible lighting strip are visible in a vehicle light assembly. The flexible lighting strip may, for example, be coupled by means of two passive connectors without electrically conductive cables in the base to two flexible lighting strips with electrical interfaces 800 as described in FIG. 20.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS

10 light-emitting diode (LED)
12 flexible support
14 carrier structure
16 flexible base
16A rigid base
18, 50 flexible side walls
18A rigid side walls
20 channel
21 normal of light output surface
22 flexible layer
22A rigid layer
24 LED chip
26 output structure
30 coating
32 exit film
34 optical processing film
36 array of lenses of facets
40, 46 air gap
42, 44 prismatic or Fresnel exit film
48 lens shape
100 flexible lighting strip
200 light guiding structure
202 light receiving surface
204 primary emission surface
204A first primary emission surface
204B second primary emission surface
204C third primary emission surface
206A, 208A first secondary emission surfaces
206B, 208B second secondary emission surface
206C, 208C third secondary emission surface 206, 208 secondary emission surface
206a light outcoupling structure
210 coupling dent
212 notch
300 coupling structure
300A first coupling structure
300B second coupling structure
302 mechanical coupling surface
304 fixing structure
306 hinge structure
308 clamping base
400 vehicle light assembly
500 connector
502, 702 coupling interface
700 lighting strip terminator
710 reflective wedge
722 (flexible) base
800 electrical interface
802 electrical connection pin
810 body of electrical interface

The invention claimed is:

1. A vehicle light assembly comprising:
   a flexible lighting strip comprising a multitude of light-emitting diodes, wherein the flexible lighting strip is arranged to be bended around at least two, more preferred three linear independent axes;
   a light guiding structure comprising a light receiving surface and a primary light emission surface, wherein the light receiving surface is arranged to receive light emitted by the flexible lighting strip, wherein the primary light emission surface is arranged to emit at least a part of the light received via the light receiving surface, and wherein the light receiving surface is arranged to define a bending of the flexible lighting strip, wherein the light guide further comprising a secondary light emission surface, and wherein the secondary light emission surface is arranged to emit at least a part of the light received via the light receiving surface, wherein the primary light emission surface is arranged to provide a higher luminance than the secondary light emission surface;
   a coupling structure, wherein the coupling structure is arranged to mechanically couple the flexible lighting strip to the light receiving surface in accordance with the bending defined by the light receiving surface,
   wherein the coupling structure is flexible, and
   wherein the coupling structure is a separate structure which comprises a mechanical coupling surface for receiving the flexible lighting strip and a fixing structure for fixing the coupling structure such that the flexible lighting strip is arranged between the mechanical coupling surface and the light receiving surface.

2. The vehicle light assembly according to claim 1, wherein the light guiding structure comprises a light guide comprising at least a part of the light receiving surface and at least a part of the primary light emission surface.

3. The vehicle light assembly according to claim 1, wherein the light guiding structure comprises a reflective structure, wherein the reflective structure comprises at least a part of the light receiving surface and at least a part of the primary light emission surface.

4. The vehicle light assembly according to claim 1, wherein the light guiding structure comprises a scattering structure, wherein the scattering structure comprises at least a part of the light receiving surface and at least a part of the primary light emission surface.

5. The vehicle light assembly according to claim 1, wherein the light receiving surface is bended around at least one, preferably at least two of the three linear independent axes.

6. The vehicle light assembly according to claim 1, wherein the light guide is arranged such that the secondary light emission surface is bended around at least two of the three linear independent axes.

7. The vehicle light assembly according to claim 6, wherein the light guide comprises at least one notch such that the primary light emission surface is discontinuous.

8. The vehicle light assembly according to claim 1, wherein the secondary light emission surface comprises a light outcoupling structure.

9. The vehicle light assembly according to claim 1, wherein the vehicle light assembly comprises at least one connector for connecting at least two end-surfaces of the at least one flexible lighting strip.

10. The vehicle light assembly according to claim 1, wherein the vehicle light assembly comprises a lighting strip terminator, wherein the lighting strip terminator is coupled to an end surface of the flexible lighting strip, wherein the light strip terminator is arranged such that light emitted by the light emitting diodes leaving the flexible lighting strip via the end surface is at least partly recycled.

11. The vehicle light assembly according to claim 1, wherein the vehicle light assembly comprises an electrical interface, wherein the electrical interface is arranged to couple the vehicle light assembly to an external power supply.

12. A vehicle light comprising a vehicle light assembly including:
   a flexible lighting strip comprising a multitude of light-emitting diodes, wherein the flexible lighting strip is arranged to be bended around at least two, more preferred three linear independent axes;
   a light guiding structure comprising a light receiving surface and a primary light emission surface, wherein the light receiving surface is arranged to receive light emitted by the flexible lighting strip, wherein the primary light emission surface is arranged to emit at least a part of the light received via the light receiving surface, and wherein the light receiving surface is arranged to define a bending of the flexible lighting strip, wherein the light guide further comprising a secondary light emission surface, and wherein the secondary light emission surface is arranged to emit at least a part of the light received via the light receiving surface, wherein the primary light emission surface is arranged to provide a higher luminance than the secondary light emission surface;
   a coupling structure, wherein the coupling structure is arranged to mechanically couple the flexible lighting strip to the light receiving surface in accordance with the bending defined by the light receiving surface,
   wherein the coupling structure is flexible, and
   wherein the coupling structure is a separate structure which comprises a mechanical coupling surface for receiving the flexible lighting strip and a fixing structure for fixing the coupling structure such that the flexible lighting strip is arranged between the mechanical coupling surface and the light receiving surface.

13. The vehicle light according to claim 12, wherein the vehicle light is a vehicle rear light.

14. The vehicle light according to claim 12, wherein the vehicle light is a vehicle front light.

15. The vehicle lighting assembly according to claim 1, wherein the fixing structure comprises flexible tooth configured to embrace corresponding bulges of the light guiding structure.

16. The vehicle lighting assembly according to claim 1, wherein the coupling structure comprises clamp fixing structures with a clamping base, wherein the clamping bases are connected by a hinge structure.

17. The vehicle lighting assembly according to claim 1, wherein the light guide structure comprises coupling dents.

18. The vehicle lighting assembly according to claim 1, wherein the coupling structure is made of a flexible plastic material configured to be force bended to the shape of the light guiding structure.

19. The vehicle lighting assembly according to claim 1, wherein the coupling structure is made of a material keeping shape after bending.

\* \* \* \* \*